US009560290B2

(12) United States Patent
Jo et al.

(10) Patent No.: US 9,560,290 B2
(45) Date of Patent: Jan. 31, 2017

(54) IMAGE PROCESSING INCLUDING IMAGE CORRECTION

(71) Applicant: Sony Corporation, Tokyo (JP)

(72) Inventors: Kensei Jo, Tokyo (JP); Shun Kaizu, Tokyo (JP); Tomoo Mitsunaga, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/472,153

(22) Filed: Aug. 28, 2014

(65) Prior Publication Data

US 2014/0368697 A1 Dec. 18, 2014

Related U.S. Application Data

(63) Continuation of application No. 13/452,977, filed on Apr. 23, 2012, now Pat. No. 8,848,063.

(30) Foreign Application Priority Data

May 2, 2011 (JP) .................................. 2011-102915

(51) Int. Cl.
*H04N 5/225* (2006.01)
*H04N 5/265* (2006.01)
(Continued)

(52) U.S. Cl.
CPC .............. *H04N 5/265* (2013.01); *G06T 5/003* (2013.01); *G06T 5/50* (2013.01); *H04N 5/217* (2013.01);
(Continued)

(58) Field of Classification Search
USPC ............................ 348/222.1, 229.1, 362–368
See application file for complete search history.

(56) References Cited

U.S. PATENT DOCUMENTS

2006/0017837 A1  1/2006  Sorek et al.
2006/0245014 A1  11/2006  Haneda
(Continued)

FOREIGN PATENT DOCUMENTS

JP  2000-050151 A  2/2000
JP  2006-253876 A  9/2006
(Continued)

OTHER PUBLICATIONS

Gu et al., Coded Rolling Shutter Photography: Flexible Space-Time Sampling, 2010 IEEE International Conference on Computational Photography (ICCP), pp. 1-8.

(Continued)

*Primary Examiner* — Twyler Haskins
*Assistant Examiner* — Dwight C Tejano
(74) *Attorney, Agent, or Firm* — Chip Law Group

(57) ABSTRACT

Long and short exposure time pixel information are input to pixel information. A long exposure time image set with the pixel values assuming all of the pixels have been exposed for a long time and a short exposure time image set with the pixel values assuming all of the pixels have been exposed for a short time are generated. A point spread function corresponding to the long exposure time image is computed as a long exposure time image PSF. A corrected image is generated using the short exposure time image, the long exposure time image, and the long exposure time image PSF. The corrected image is generated as a wide dynamic range image utilizing the pixel information for the long and short exposure time image. Utilizing the pixel information for the short exposure time image with little blurring, makes the corrected image a high quality corrected image with little blurring.

18 Claims, 14 Drawing Sheets

(51) Int. Cl.
  *H04N 5/217* (2011.01)
  *H04N 5/235* (2006.01)
  *H04N 9/04* (2006.01)
  *G06T 5/00* (2006.01)
  *G06T 5/50* (2006.01)
  *H04N 5/262* (2006.01)

(52) U.S. Cl.
  CPC .......... *H04N 5/2355* (2013.01); *H04N 5/2621* (2013.01); *H04N 9/045* (2013.01); *G06T 2207/20224* (2013.01)

(56) References Cited

U.S. PATENT DOCUMENTS

| | | | |
|---|---|---|---|
| 2007/0285526 A1* | 12/2007 | Mann et al. | 348/222.1 |
| 2007/0292048 A1* | 12/2007 | Choe et al. | 382/286 |
| 2008/0143841 A1* | 6/2008 | Tico | H04N 5/23248 348/208.99 |
| 2008/0158376 A1 | 7/2008 | Miki | |
| 2008/0170124 A1 | 7/2008 | Hatanaka et al. | |
| 2009/0091645 A1* | 4/2009 | Trimeche et al. | 348/273 |
| 2010/0053346 A1 | 3/2010 | Mitsunaga | |
| 2010/0295953 A1 | 11/2010 | Torii et al. | |
| 2010/0309333 A1* | 12/2010 | Smith et al. | 348/230.1 |
| 2011/0157383 A1 | 6/2011 | Jang | |
| 2011/0279693 A1 | 11/2011 | Hamada | |
| 2012/0218426 A1* | 8/2012 | Kaizu et al. | 348/208.4 |
| 2012/0281111 A1 | 11/2012 | Jo et al. | |

FOREIGN PATENT DOCUMENTS

| | | |
|---|---|---|
| JP | 2006-311240 A | 11/2006 |
| JP | 2008-099158 A | 4/2008 |
| JP | 2010-062785 A | 3/2010 |
| JP | 2010-109948 A | 5/2010 |

OTHER PUBLICATIONS

Yuan et al., Image Deblurring with Blurred/Noisy Image Pairs, ACM SIGGRAPH 2007 Papers, ACM, Article No. 1.

* cited by examiner

FIG.13

(A) EXAMPLE OF EXPOSURE TIME SETTINGS IN PIXEL PORTION (B) EXAMPLE OF EXPOSURE TIME SETTINGS IN PIXEL PORTION (C) EXAMPLE OF EXPOSURE TIME SETTINGS IN PIXEL PORTION

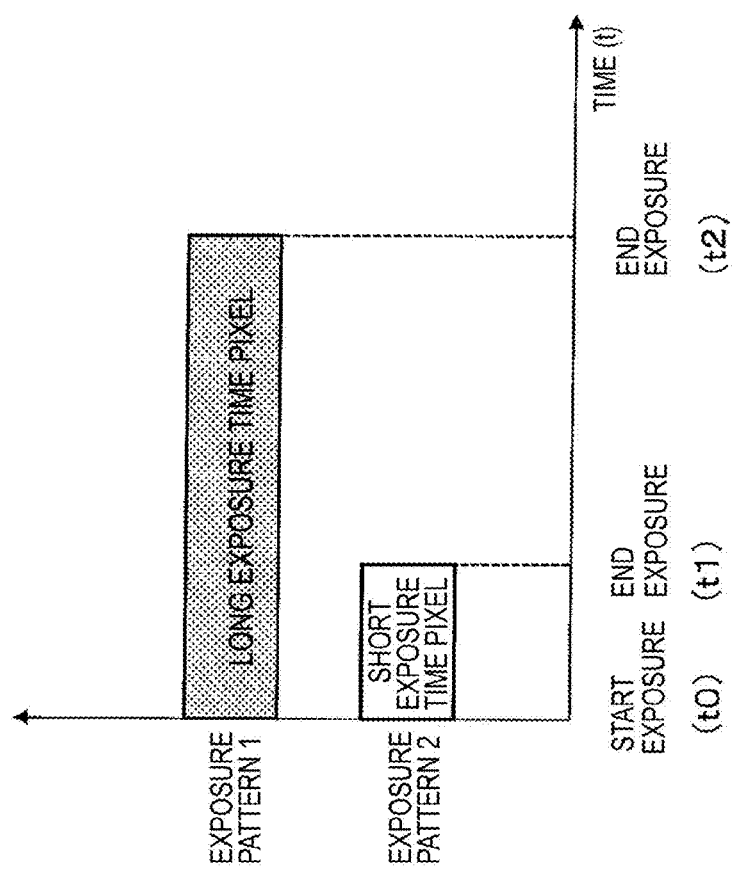

IMAGE PROCESSING INCLUDING IMAGE CORRECTION

CROSS REFERENCES TO RELATED APPLICATIONS

This application is a continuation of and claims the benefit under 35 U.S.C. §120 of U.S. patent application Ser. No. 13/452,977, titled "IMAGE PROCESSING INCLUDING IMAGE CORRECTION" and filed on Apr. 23, 2012, which claims the benefit under 35 U.S.C. §119 of Japanese Patent Application 2011-102915, filed on May 2, 2011, each of which is hereby incorporated by reference herein in its entirety.

BACKGROUND OF THE INVENTION

The present disclosure relates to an image processing device, an image processing method, and a program. In particular, the present disclosure relates to an image processing device, an image processing method, and a program that generate an image with a dynamic range that is wide.

A solid image capture element that is used in a video camera or a digital still camera, such as a CCD image sensor or a complementary metal oxide semiconductor (CMOS) image sensor, accumulates an electrical charge that corresponds to the amount of incident light and performs a photoelectric conversion that outputs an electrical signal that corresponds to the accumulated electrical charge. However, there is an upper limit to the amount of the electrical charge that is accumulated in the photoelectric conversion element, and when more than a fixed amount of light is received, the amount of the accumulated electrical charge reaches a saturation level, such that what are called blown out highlights, which are set at a saturated brightness level, occur in regions of the photographic subject where the brightness is greater than a fixed value.

In order to prevent this sort of phenomenon from occurring, processing is performed that adjusts the exposure time by controlling the period during which the electrical charge is accumulated in the photoelectric conversion element, in accordance with variations in the outside light and the like, and that also adjusts the sensitivity to an optimum value. For example, for a bright subject, the exposure time is shortened by using a faster shutter speed, shortening the period during which the electrical charge is accumulated in the photoelectric conversion element, and the electrical signal is output before the amount of the accumulated electrical charge reaches the saturation level. This sort of processing makes it possible to output an image that accurately reproduces the gray-scale levels of the subject.

However, in capturing an image of a subject that has a mixture of bright regions and dark regions, using a fast shutter speed means that the exposure time will not be sufficient for the dark portions, so the signal-to-noise ratio worsens, and the image quality deteriorates. In order to accurately reproduce the brightness levels of the bright portions and the dark portions in a captured image of a subject that has a mixture of bright regions and dark regions, processing must be performed that increases the exposure time and achieves a high signal-to-noise ratio for the image sensor pixels where the amount of the incident light is low and that avoids saturation in the pixels where the amount of the incident light is high.

As a technique for implementing this sort of processing, a technique is known that sequentially captures and combines a plurality of images with different exposure times. Specifically, an image with a long exposure time and an image with a short exposure time are captured separately in sequence. The technique generates a single image by performing combining processing that uses the long exposure time image for the dark image regions and uses the short exposure time image for the bright image regions where the highlights are blown out in the long exposure time image. Combining a plurality of images with different exposures in this manner makes it possible produce an image with a dynamic range that is wide and in which there are no blown out highlights, that is, a wide dynamic range image (a high dynamic range (HDR) image).

For example, Japanese Patent Application Publication No. JP-A 2008-99158 discloses a configuration that produces a wide dynamic range image by combining a plurality of images with different amounts of exposure. The processing will be explained with reference to FIG. 1. An image capture element, in capturing moving images, for example, outputs image data for two different exposure times within a video rate (30 to 60 fps). In capturing still images, too, the image data are generated for two different exposure times and output. FIG. 1 is a figure that explains characteristics of images (a long exposure time image, a short exposure time image) that the image capture element generates and that have two different exposure times. The horizontal axis is time (t), and the vertical axis is an accumulated electrical charge (e) in a light-receiving photo diode (PD) that configures a photoelectric conversion element that corresponds to one pixel of a solid image capture element.

For example, in a case where the amount of light that the light-receiving photo diode (PD) is large, that is, where it corresponds to a bright subject, the accumulated electrical charge increases rapidly as time elapses, as shown in a high brightness region 11 that is shown in FIG. 1. In contrast, in a case where the amount of light that the light-receiving photo diode (PD) is small, that is, where it corresponds to a dark subject, the accumulated electrical charge increases slowly as time elapses, as shown in a low brightness region 12 that is shown in FIG. 1.

The time from t0 to t3 is equivalent to an exposure time TL for acquiring the long exposure time image. The line that is shown in the low brightness region 12 shows that the accumulated electrical charge at the time t3, even as the long exposure time TL, has not reached the saturation level (unsaturated point Py), and an accurate gray-scale expression can be produced according to the gray level of the pixel that is set using an electrical signal that is produced based on the accumulated electrical charge (Sa).

However, the line that is shown in the high brightness region 11 clearly indicates that the accumulated electrical charge has already reached the saturation level (saturated point Px) before it reaches the time t3. Therefore, in the high brightness region 11, only a pixel value that corresponds to an electrical signal at the saturation level is produced from the long exposure time image, resulting in a pixel that is blown out.

Accordingly, in the high brightness region 11, the accumulated electrical charge is swept out of the light-receiving photo diode (PD) once before the time t3 is reached, for example, at a time t1 (a charge sweeping starting point P1) that is shown in FIG. 1. The charge sweeping does not sweep out the entire accumulated electrical charge in the light-receiving photo diode (PD), but sweeps it down to an intermediate voltage hold level that is controlled by the photo diode (PD). After the charge sweeping processing, the light-receiving photo diode (PD) is once again exposed to light for a short time that is defined as an exposure time TS (from t2 to t3 ). That is, a short time exposure is made for the period from a short exposure time starting point P2 to a short exposure time ending point P3, which are both shown in FIG. 1. An accumulated electrical charge (Sb) is produced by the short time exposure, and the gray level of the pixel is set using an electrical signal that is produced based on the accumulated electrical charge (Sb).

Note that in the setting of the pixel value using the electrical signal that is based on the accumulated electrical charge (Sa) that is produced by the long time exposure in the low brightness region 12 and using the electrical signal that is based on the accumulated electrical charge (Sb) that is produced by the short time exposure in the high brightness region 11, an estimated accumulated electrical charge is computed for a case in which the exposure times are the same in the two regions, an electrical signal output value that corresponds to the estimated accumulated electrical charge is computed, and the pixel value is set based on the results of the computations.

Combining the short exposure time image and the long exposure time image in this manner makes it possible to produce an image that has no blown out highlights and a dynamic range that is wide.

Furthermore, Japanese Patent Application Publication No. JP-A 2000-50151 discloses a configuration that captures a plurality of images with different amounts of exposure, in the same manner as described in Japanese Patent Application Publication No. JP-A 2008-99158, and in the performing of the combining processing, inhibits the occurrence of false color that is associated with the combining by comparing the plurality of the images with the different amounts of exposure, specifying a pixel region where there is movement, and performing correction.

However, with the configurations that are described in Japanese Patent Application Publication No. JP-A 2008-99158 and Japanese Patent Application Publication No. JP-A 2000-50151, it is necessary to capture the long exposure time image and the short exposure time image individually and perform the processing that combines them.

In this manner, using a plurality of images for which the exposure times have been changed makes it possible to produce the wide dynamic range image (the high dynamic range (HDR) image), but the problems that are described below, for example, occur in the processing that is based on the plurality of the images.

First problem: The image capture must be performed a plurality of times.

Second problem: A plurality of images that have been captured at different times are combined, and captured image data with long exposure times are used, so the process is vulnerable to the effects of camera instability.

Known technologies for solving these problems include the known technologies described below, for example.

Technique for Solving First Problem

The pixels within a single solid image capture element are set in two types of exposure patterns, that is, pixels with two different types of exposure time control, pixels that are exposed for a short time, and pixels that are exposed for a long time. This processing makes it possible to capture images with the short time exposure and the long time exposure pixels almost simultaneously.

For example, this sort of configuration is disclosed in Japanese Patent Application Publication No. JP-A 2006-311240 and Japanese Patent Application Publication No. JP-A 2006-253876.

However, with these configurations, there is a problem in that the exposure times vary from one pixel to the next, so the long exposure time pixels are more susceptible to blurring than the short exposure time pixels, and it is difficult to completely eliminate the effects of camera instability.

Technique for Solving Second Problem

For example, "SIGGRAPH 2007: Image Deblurring with Blurred/Noisy Image Pairs" proposes a technique for producing a high-quality image from a short exposure time image with a lot of noise and a long exposure time image that has blurring. However, even with the disclosed technique, it is necessary to perform image capture twice, once with a short exposure time and once with a long exposure time.

Japanese Patent Application Publication No. JP-A 2010-109948 proposes a technique that, by estimating an amount of movement based on a plurality of images, corrects blurring in a captured image that has been captured with a wide dynamic range.

Furthermore, in "Coded Rolling Shutter Photography: Flexible Space-Time Sampling (ICCP2010)," a technique is disclosed that simultaneously performs image stabilization and processing that combines wide dynamic range images (HDR combining), based on image data that have been captured by varying the exposure times within a single solid image capture element one line at a time.

However, in order for the amount of blurring to be estimated when the exposure times are varied one line at a time, the image must be captured by combining pixels with at least three different exposure times, giving rise to a problem of blurring in the vertical direction. Moreover, the technique here described involves processing of an image after demosaicing, in which the RGB values have been set for each of the pixel positions, so a color array such as a Bayer array or the like is not taken into consideration.

Japanese Patent Application Publication No. JP-A 2010-62785 proposes a technique that, by implementing a control method for the solid image capture element, intermittently captures images with short exposure times while a long exposure time image is being captured. However, there is a problem in that the short exposure time image capture must be performed a plurality of times, which makes the control more complicated.

SUMMARY OF THE INVENTION

In light of the problems that are described above, for example, the present disclosure provides an image processing device, an image processing method, and a program that generate an image with a dynamic range that is wide by using a single captured image, without individually capturing a plurality of images with different exposure times.

The present disclosure also provides an image processing device, an image processing method, and a program that generate an image with a dynamic range that is wide and in which blurring of the captured image that is due to instability is particularly suppressed.

According to an embodiment of the present disclosure, there is provided an image processing device which includes an image capture element that outputs long exposure time pixel information and short exposure time pixel information based on image capture processing under a control that provides different exposure times for individual pixels, and an image correction portion that inputs the pixel information that the image capture element has output and generates a corrected image by performing image stabilization and dynamic range expansion processing. The image correction portion generates a long exposure time image in which the pixel values have been set on the assumption that all of the pixels have been exposed for a long time and a short exposure time image in which the pixel values have been set on the assumption that all of the pixels have been exposed for a short time, computes a point spread function (a PSF) that corresponds to the long exposure time image as a long exposure time image PSF, and generates the corrected image by using the short exposure time image, the long exposure time image, and the long exposure time image PSF.

Further, according to an embodiment of the image processing device of the present disclosure, the image correction portion computes a PSF that corresponds to the short exposure time image as a short exposure time image PSF, and generates the corrected image by using the short exposure time image, the long exposure time image, the long exposure time image PSF, and the short exposure time image PSF.

Further, according to an embodiment of the image processing device of the present disclosure, the image correction portion generates, based on the short exposure time image, a first estimated image for which it is assumed that exposure was performed for a long time, computes a first correction amount that makes a difference between the first estimated image and the long exposure time image smaller, and generates the corrected image by performing processing that adds the computed first correction amount to an initial image that has been generated based on the short exposure time image.

Further, according to an embodiment of the image processing device of the present disclosure, the image correction portion performs division processing that takes a result of a discrete Fourier transform that is based on a pixel value for a specific color that has been selected from the long exposure time image and divides it by a result of a discrete Fourier transform that is based on a pixel value for a specific color that has been selected from the short exposure time image, and computes the long exposure time image PSF by performing an inverse discrete Fourier transform on the result of the division processing and performing processing on the result of the inverse discrete Fourier transform that performs noise removal and identifies a linking component that passes through an origin point.

Further, according to an embodiment of the image processing device of the present disclosure, the image correction portion performs division processing that takes a result of a discrete Fourier transform that is based on a pixel value for a specific color that has been selected from the long exposure time image and divides it by a result of a discrete Fourier transform that is based on a pixel value for a specific color that has been selected from the short exposure time image, and computes the long exposure time image PSF by performing an inverse discrete Fourier transform on the result of the division processing, performing processing on the result of the inverse discrete Fourier transform that performs noise removal and identifies a linking closed region that passes through an origin point, extending the length of a line segment that links the origin point and the center of gravity of the closed region to twice its original length, with the origin point at the center, and defining the extended line segment as the long exposure time image PSF.

Further, according to an embodiment of the image processing device of the present disclosure, the image correction portion computes a PSF that corresponds to the short exposure time image as a short exposure time image PSF, computing the short exposure time image PSF by multiplying, by a factor that is equal to two times the ratio of an exposure time for a second exposure condition to an exposure time for a first exposure condition, the length of a line segment that links an origin point and the center of gravity of the long exposure time image PSF, with the origin point at the center.

Further, according to an embodiment of the image processing device of the present disclosure, the image correction portion includes a first correction amount computation portion that, from a long exposure time image PSF that is computed based on the long exposure time image, from an initial image that is generated based on the short exposure time image, and from the long exposure time image, computes a first correction amount for the initial image, a second correction amount computation portion that, from a short exposure time image PSF that is computed based on the short exposure time image, and from the initial image, computes a second correction amount for the initial image, and an addition portion that adds the first correction amount and the second correction amount for the initial image.

Further, according to an embodiment of the image processing device of the present disclosure, the first correction amount computation portion includes a first estimated image computation portion that computes a first estimated image that is a result of estimating an image that is similar to the long exposure time image, based on the initial image and the long exposure time image PSF, a subtraction portion that computes a first difference image that is the difference between the long exposure time image and the first estimated image, and a first correction amount estimation portion that computes the first correction amount based on the first difference image and the long exposure time image PSF.

Further, according to an embodiment of the image processing device of the present disclosure, the first estimated image computation portion includes a color-specific PSF computation portion that computes a first color-specific PSF that combines the characteristics of the long exposure time image PSF for each color (phase) of a pixel of the image capture element, a first convolution computation portion that performs a convolution computation for each color of an object pixel of the initial image using the first color-specific PSF, and a saturation processing portion that takes a results image that has been output from the first convolution computation portion and outputs an image by replacing pixel values that are not less than a value that is equivalent to a saturated pixel value of the image capture element with the value that is equivalent to the saturated pixel value.

Further, according to an embodiment of the image processing device of the present disclosure, the first correction amount estimation portion includes an inverse color-specific PSF computation portion that computes a first inverse color-specific PSF in which the long exposure time image PSF has been inverted symmetrically with respect to a point, a second convolution computation portion that performs a convolution computation for each color of an object pixel of the first difference image using the first inverse color-specific PSF, and a multiplication portion that performs a correction amount adjustment by multiplying a correction amount adjustment parameter times a results image that has been output from the second convolution computation portion.

Further, according to an embodiment of the image processing device of the present disclosure, the image correction portion includes a demosaic processing portion that performs demosaic processing on the long exposure time image and the short exposure time image, and the image correction portion generates the corrected image based on a demosaiced image that is a processing result of the demosaic processing portion.

Further, according to another embodiment of the present disclosure, there is provided an image processing method that is implemented in an image processing device, including outputting by an image capture element of long exposure time pixel information and short exposure time pixel information based on image capture processing under a control that provides different exposure times for individual pixels, and generating by an image correction portion of a corrected image by the inputting of the pixel information that the image capture element has output and the performing of image stabilization and dynamic range expansion processing on the pixel information. The generating of the corrected image includes generating of a long exposure time image in which the pixel values have been set on the assumption that all of the pixels have been exposed for a long time and generating of a short exposure time image in which the pixel values have been set on the assumption that all of the pixels have been exposed for a short time, computing of a point spread function (a PSF) that corresponds to the long exposure time image as a long exposure time image PSF, and generating of the corrected image by using the short exposure time image, the long exposure time image, and the long exposure time image PSF.

Further, according to another embodiment of the present disclosure, there is provided a program that causes image processing to be performed in an image processing device, including outputting by an image capture element of long exposure time pixel information and short exposure time pixel information based on image capture processing under a control that provides different exposure times for individual pixels, and generating by an image correction portion of a corrected image by the inputting of the pixel information that the image capture element has output and the performing of image stabilization and dynamic range expansion processing on the pixel information. The generating of the corrected image includes generating of a long exposure time image in which the pixel values have been set on the assumption that all of the pixels have been exposed for a long time and generating of a short exposure time image in which the pixel values have been set on the assumption that all of the pixels have been exposed for a short time, computing of a point spread function (a PSF) that corresponds to the long exposure time image as a long exposure time image PSF, and generating of the corrected image by using the short exposure time image, the long exposure time image, and the long exposure time image PSF.

Note that the program according to the present disclosure is a program that can be provided in a storage medium or communication medium that is provided in a computer-readable form for an information processing device or a computer system that is capable of executing various types of program code, for example. Providing this sort of program in a computer-readable form makes it possible to implement the processing according to the program in the information processing device or the computer system.

The object, features, and advantages of the present disclosure will be made clear later by a more detailed explanation that is based on the embodiments of the present disclosure and the appended drawings.

According to the example of the present disclosure, a device and a method are achieved that generate an image with reduced blurring and a wide dynamic range based on a single captured image. Specifically, the device includes an image capture element that outputs long exposure time pixel information and short exposure time pixel information based on image capture processing under a control that provides different exposure times for individual pixels, and also includes an image correction portion that inputs the pixel information that the image capture element has output and generates a corrected image by performing image stabilization and dynamic range expansion processing.

The image correction portion generates a long exposure time image in which the pixel values have been set on the assumption that all of the pixels have been exposed for a long time and a short exposure time image in which the pixel values have been set on the assumption that all of the pixels have been exposed for a short time, computes a point spread function (a PSF) that corresponds to the long exposure time image as a long exposure time image PSF, and generates the corrected image by using the short exposure time image, the long exposure time image, and the long exposure time image PSF. The corrected image is generated as a wide dynamic range image that utilizes the pixel information for the long exposure time image and the pixel information for the short exposure time image. Utilizing the pixel information for the short exposure time image, in which there is little blurring, also makes the corrected image a high quality corrected image in which the blurring is suppressed.

BRIEF DESCRIPTION OF THE DRAWINGS

FIG. 13 is a figure that explains another example of the configuration of the image capture element in the image processing device according to the present disclosure; and FIG. 14 is a figure that explains an example of exposure control in the image processing device according to the present disclosure.

DETAILED DESCRIPTION OF EMBODIMENT

Figure 1:
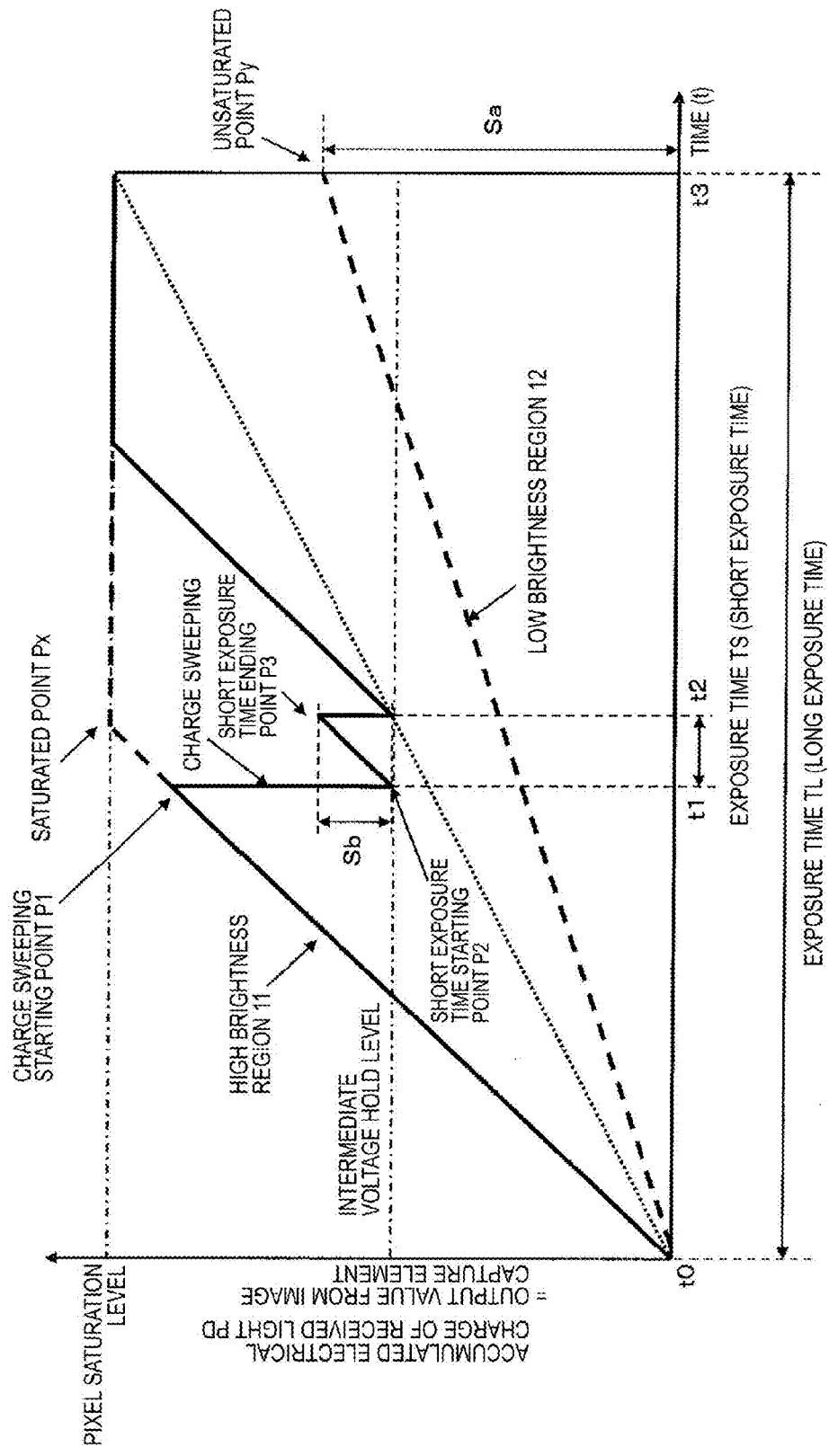
FIG. 1 is a figure that explains processing that produces an image with a wide dynamic range by combining a plurality of images with different amounts of exposure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, an image processing device, an image processing method, and a program according to the present disclosure will be explained with reference to the drawings. The explanation will cover the items below in order.

1. Example of an overall configuration of the image processing device
2. Example of a configuration of an image capture element
3. Details of a configuration of and processing by an image correction portion
  (3-1) Details of a configuration of and processing that is performed by an interpolation processing portion
  (3-2) Details of a configuration of and processing that is performed by a PSF estimation portion
  (3-3) Details of a configuration of and processing that is performed by an image stabilization and dynamic range expansion processing portion
4. Examples of other configurations
5. Examples of other processing and concomitant configurations and their effects
6. Summary of the configurations of the present disclosure 1. Example of an Overall Configuration of the Image Processing Device First, an example of an overall configuration of the image processing device according to the present disclosure will be explained with reference to FIG. 2.

Figure 2:
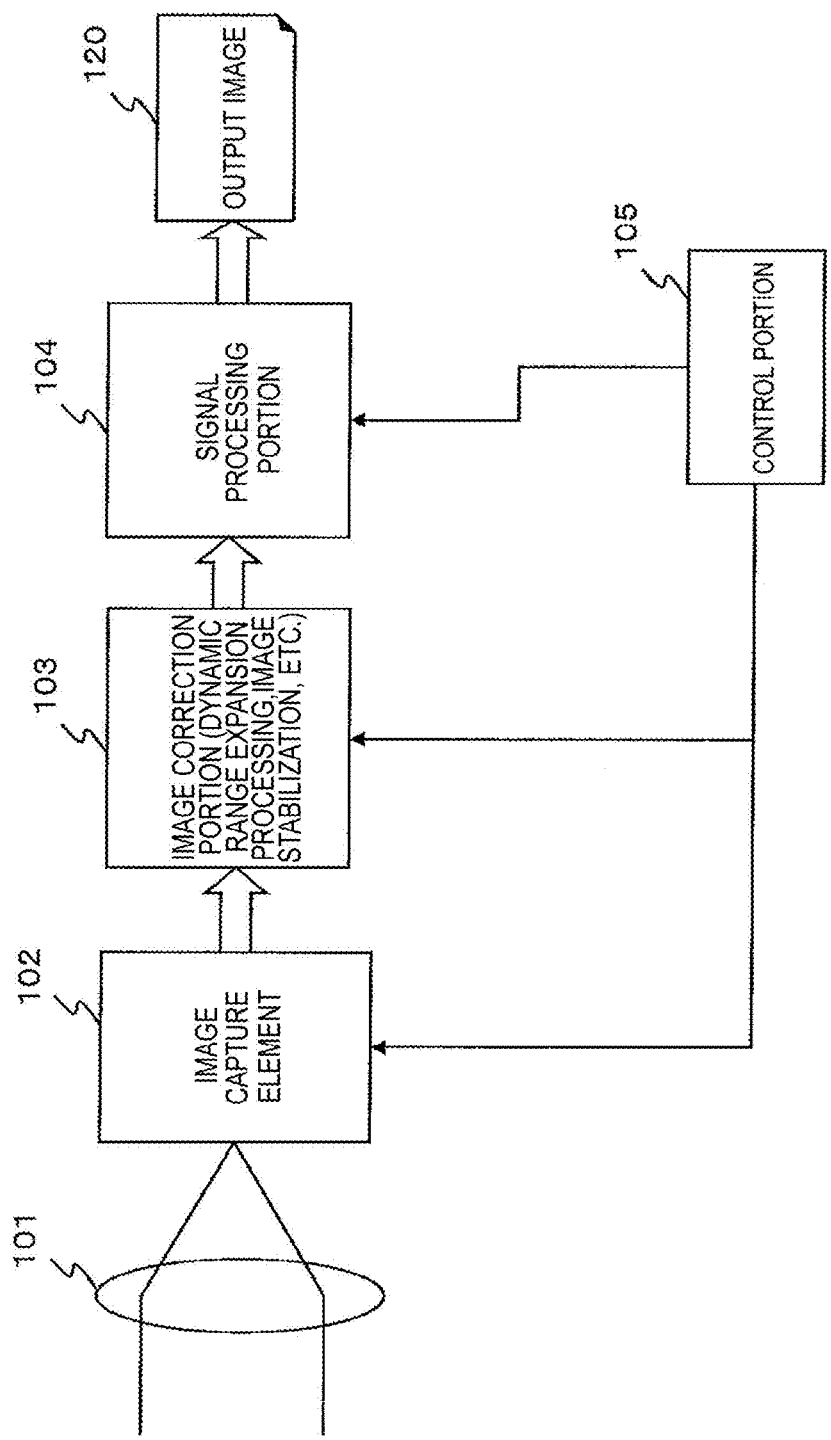
FIG. 2 is a figure that shows an example of a configuration of an image processing device according to the present disclosure.

FIG. 2 is a block diagram that shows a configuration of an image capture device that is an example of the image processing device according to the present disclosure. Light that enters through an optical lens 101 is incident upon an image capture element 102 that is configured from a CMOS image sensor or the like, for example, where the light undergoes photoelectric conversion and image data are output. The output image data are input to an image correction portion 103.

Note that the configuration of the image capture element 102 is such that one of the exposure time and the read time is cyclically controlled, one of one line at a time and one pixel at a time, under the control of a control portion 105, such that long exposure time pixels and short exposure time pixels are defined.

The image correction portion 103 performs image correction processing that includes dynamic range expansion processing and image stabilization processing. The details of this processing will be explained in detail at a later stage. A corrected image that has been generated by the image correction portion 103 is input to a signal processing portion 104. The signal processing portion 104 performs signal processing that is generally performed in a camera, such as white balance (WB) adjustment, gamma correction, and the like, then generates an output image 120. The output image 120 is stored in a storage portion that is not shown in the drawings. Alternatively, the output image 120 is output to a display portion.

The control portion 105 outputs control signals to various portions and performs various types of processing control in accordance with a program that is stored in a memory, for example, that is not shown in the drawings.

2. Example of a Configuration of the Image Capture Element 102

One of the exposure time and the read time of the image capture element 102, which is configured from a CMOS image sensor or the like, for example, is cyclically controlled, one of one line at a time and one pixel at a time, by the control portion 105.

Figure 3:
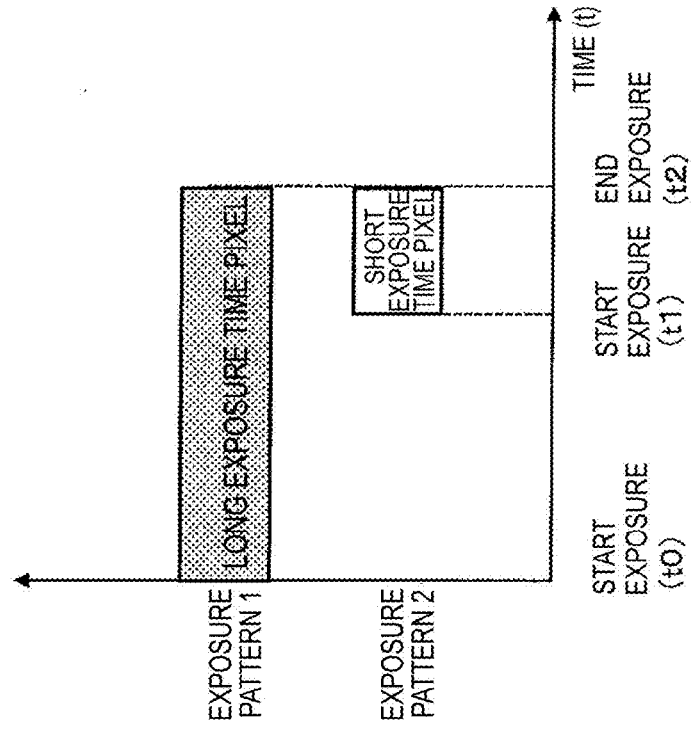
FIG. 3 is a figure that explains an example of a configuration of and processing by an image capture element in the image processing device according to the present disclosure.

Specifically, as shown in part (a) of FIG. 3, for example, long exposure time pixels and short exposure time pixels are defined.

Note that in the present example, the pixel array of the image capture element 102 is defined as a Bayer array. However, this is merely one example, and the processing according to the present disclosure can also be applied to other pixel arrays.

Part (b) of FIG. 3 shows an example of the settings for the exposure start times and the exposure end times for the long exposure time pixels and the short exposure time pixels.

In the present example, the ratio of the exposure times for the long exposure time pixels and the short exposure time pixels is 4:1, and the exposure start times are set to different times, while the exposure end times (the read times) are set to be the same.

Note that these settings are merely examples, and various other setting can also be made.

However, the image capture element 102 has a configuration that is capable of acquiring pixel information from pixels for which a plurality of different exposure times have been set for a single round of image capture.

3. Details of a Configuration of and Processing by the Image Correction Portion 103

Next, Details of a configuration and processing of the image correction portion 103 will be explained with reference to FIG. 4 and subsequent drawings.

As was explained above with reference to FIG. 2, the output of the image capture element 102, which contains the pixels for which the plurality of the different exposure times have been set, is input to the image correction portion 103, where the corrected image, for which the dynamic range has been expanded and image stabilization has been performed, is generated and output to the signal processing portion 104.

Figure 4:
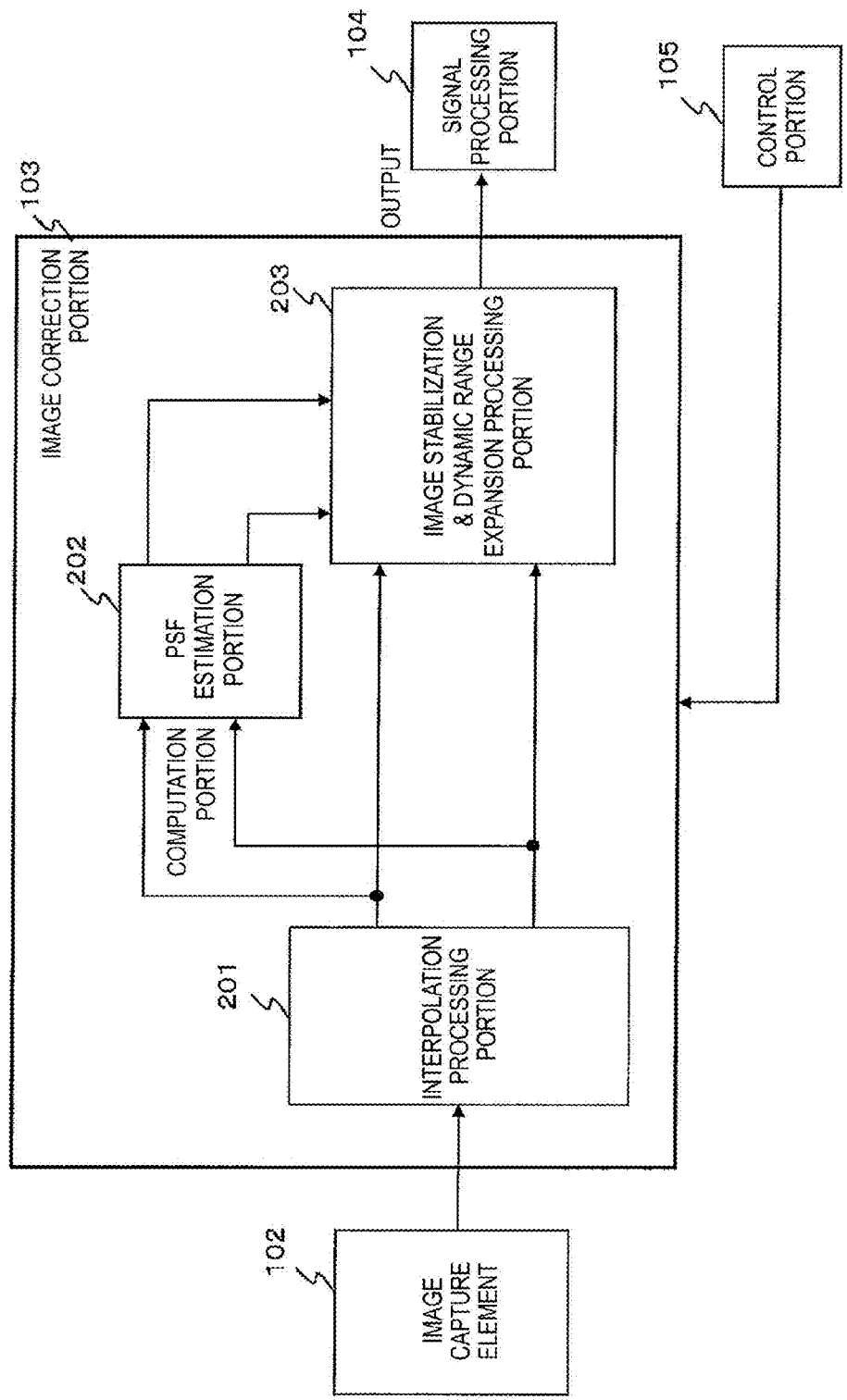
FIG. 4 is a figure that explains an example of a configuration of an image correction portion in the image processing device according to the present disclosure.

As shown in FIG. 4, the image correction portion 103 includes an interpolation processing portion 201, a PSF estimation portion 202, and an image stabilization and dynamic range expansion processing portion 203. Hereinafter, details of the processing that is performed by these structural portions will be explained in the order shown below.

(3-1) Details of a configuration of and processing that is performed by the interpolation processing portion 201

(3-2) Details of a configuration of and processing that is performed by the PSF estimation portion 202

(3-3) Details of a configuration of and processing that is performed by the image stabilization and dynamic range expansion processing portion 203

(3-1) Details of a Configuration of and Processing that is Performed by the Interpolation Processing Portion 201

First, the details of the configuration of and processing that is performed by the interpolation processing portion 201 that is shown in FIG. 4 will be explained.

As shown in FIG. 4, the output of the image capture element 102 is input to the interpolation processing portion 201 of the image correction portion 103.

The processing in the interpolation processing portion 201 will be explained with reference to FIG. 5.

The interpolation processing portion 201 inputs from the image capture element 102 an output image 301 in which different exposure times have been set one pixel at a time, and the interpolation processing portion 201 generates two exposure time images, a first exposure time image (a long exposure time image) 321 and a second exposure time image (a short exposure time image) 322.

The interpolation processing portion 201 performs interpolation processing such that various exposure patterns are formed for all of the pixels. Various interpolation methods can be applied in the interpolation processing, such as a method of interpolating by filters, such as linear interpolation or the like, a method of detecting the directions of edges in the image and interpolating based on those edges, and the like.

For example, the first exposure time image (a long exposure time image) 321 uses the long exposure time pixels that are contained in the output image 301 from the image capture element 102 in their existing form. When the long exposure time pixels are interpolated among the positions of the short exposure time pixels in the image capture element 102, processing can be performed that computes the interpolated pixel values by the aforementioned method of interpolating by filters, such as linear interpolation or the like, based on the pixel values of the surrounding long exposure time pixels. The interpolated pixel values can also be computed by detecting the directions of the edges in the image, then taking the directions of the edges into consideration by assigning greater weightings to pixel values in the directions in which the differences in the pixel values are low.

The second exposure time image (a short exposure time image) 322 uses the short exposure time pixels that are contained in the output image 301 from the image capture element 102 in their existing form. When the short exposure time pixels are interpolated among the positions of the long exposure time pixels in the image capture element 102, processing can be performed that computes the interpolated pixel values by the aforementioned method of interpolating by filters, such as linear interpolation or the like, based on the pixel values of the surrounding short exposure time pixels. The interpolated pixel values can also be computed by detecting the directions of the edges in the image, then taking the directions of the edges into consideration by assigning greater weightings to pixel values in the directions in which the differences in the pixel values are low.

Figure 5:
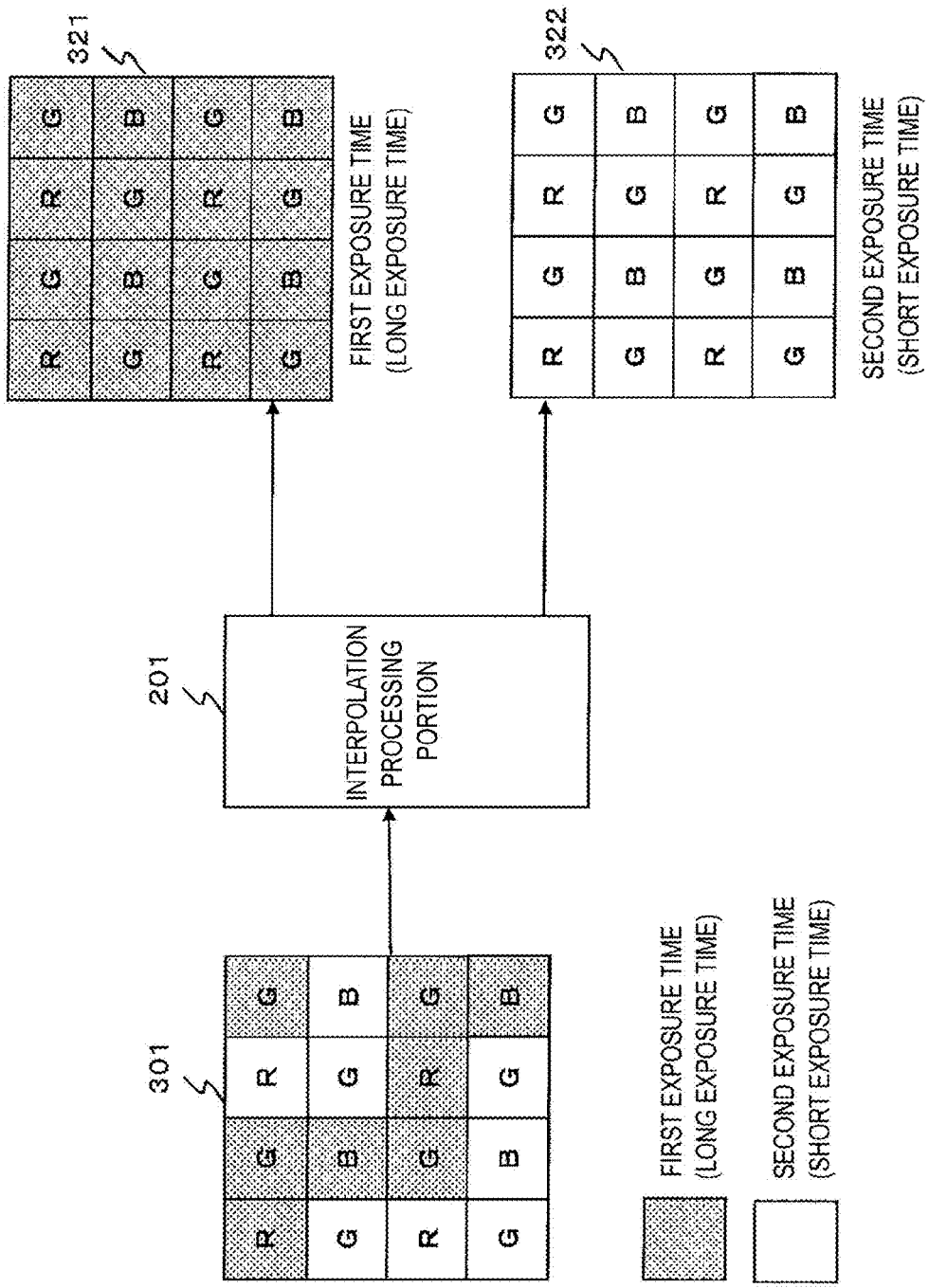
FIG. 5 is a figure that explains an example of processing by an interpolation processing portion of the image correction portion in the image processing device according to the present disclosure.

By performing the interpolation processing on the output image 301 from the image capture element 102, as shown in FIG. 5, the interpolation processing portion 201 generates the first exposure time image (the long exposure time image) 321 with a long exposure time Bayer array and the second exposure time image (the short exposure time image) 322 with a short exposure time Bayer array As shown in FIG. 4, the images 321, 322 that the interpolation processing portion 201 has generated with the two different exposure times are input to the PSF estimation portion 202 and the image stabilization and dynamic range expansion processing portion 203.

(3-2) Details of a Configuration of and Processing that is Performed by the PSF Estimation Portion 202

Next, the details of the configuration of and processing that is performed by the PSF estimation portion 202 that is shown in FIG. 4 will be explained.

The PSF estimation portion 202 performs processing that estimates a point spread function (PSF).

The processing that the PSF estimation portion 202 performs will be explained with reference to FIGS. 6 and 7.

Figure 6:
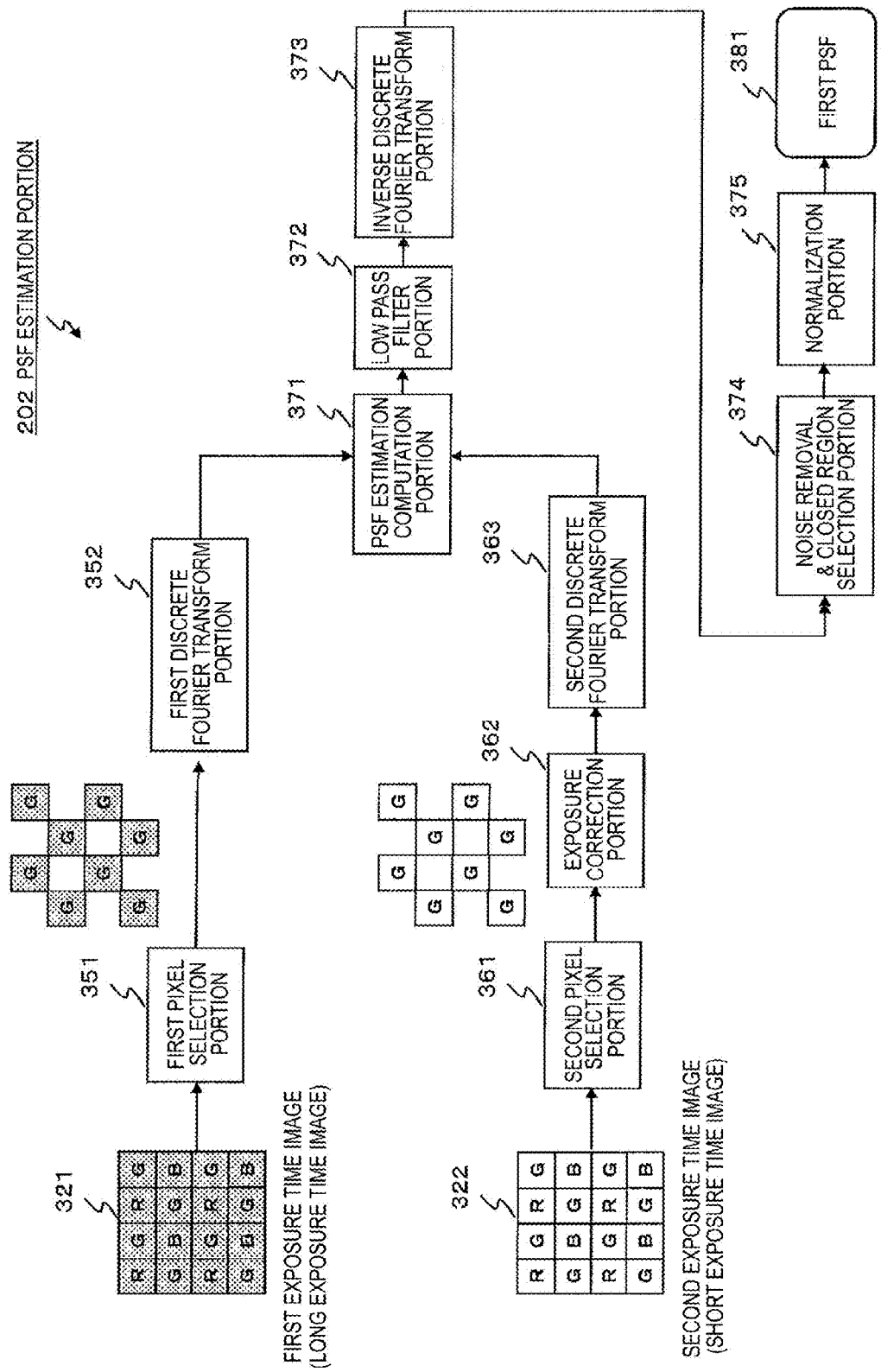
FIG. 6 is a figure that explains an example of a configuration of and processing by a PSF estimation portion of the image correction portion in the image processing device according to the present disclosure.
Figure 7:
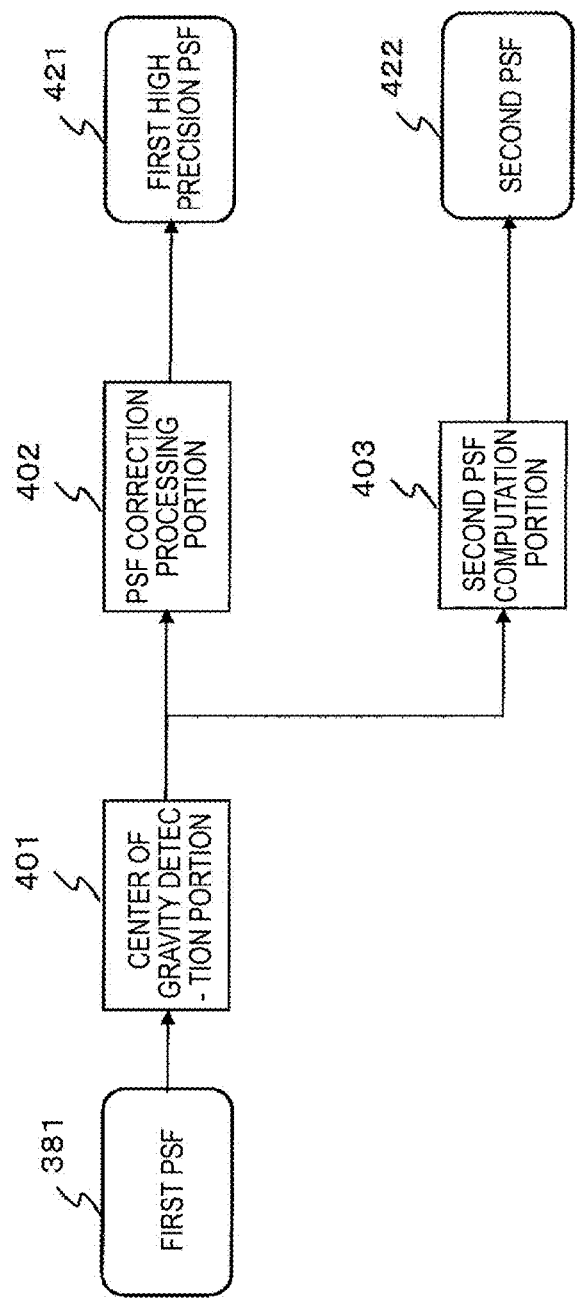
FIG. 7 is a figure that explains an example of the configuration of and the processing by the PSF estimation portion of the image correction portion in the image processing device according to the present disclosure.

FIG. 6 shows a first half of the PSF estimation portion 202, and FIG. 7 shows a second half of the PSF estimation portion 202.

First, the processing in the first half of the PSF estimation portion 202 will be explained with reference to FIG. 6.

As shown in FIG. 6, the PSF estimation portion 202 inputs the two images that have been generated by the interpolation processing portion 201, that is, the first exposure time image (the long exposure time image) 321 and the second exposure time image (the short exposure time image) 322.

A first pixel selection portion 351 extracts only G pixels from the first exposure time image (the long exposure time image) 321.

A second pixel selection portion 361 extracts only G pixels from the second exposure time image (the short exposure time image) 322.

In the processing that extracts the G pixels, the pixel values for the pixels other than the G pixels are set to zero.

An exposure correction portion 362, by multiplying the G pixel data that have been extracted from the second exposure time image (the short exposure time image) 322 times an exposure ratio, generates an image that has almost the same brightness as the first exposure time image 321. This will be explained in detail at a later stage.

Note that under ordinary circumstances, it is necessary to interpolate the G pixels among all of the pixel positions by using bilinear interpolation or the like, but this processing is equivalent to applying a low pass filter after a Fourier transform, so in the present example, the cost of computation is reduced by instead eliminating the high frequency components after a discrete Fourier transform.

The data that include only the pixel values for the G pixels are output to first and second discrete Fourier transform portions 352, 363.

Note that, as will be described later, the G pixels from the second exposure time image 322, which is the short exposure time image, are output to the second discrete Fourier transform portion 363 after the exposure correction in the exposure correction portion 362.

The first and second discrete Fourier transform portions 352, 363 each perform a discrete Fourier transform using a window function.

The first discrete Fourier transform portion 352 computes a long exposure time G pixel Fourier transform result based on the G pixel data that have been generated from the first exposure time image (the long exposure time image) 321.

The second discrete Fourier transform portion 363 computes a short exposure time G pixel Fourier transform result based on the G pixel data that have been generated by performing the exposure correction on the second exposure time image (the short exposure time image) 322.

The Fourier transform results are output to a PSF estimation computation portion 371.

The PSF estimation computation portion 371 computes the quotient of the two Fourier transform results. That is, the quotient is computed as shown below.

Quotient=(long exposure time G pixel Fourier transform result)/(short exposure time G pixel Fourier transform result)

The quotient is output to a low pass filter portion 372.

The low pass filter portion 372 performs processing that sets to zero the high frequency components that are included in the quotient. The result of eliminating the high frequencies is output to an inverse discrete Fourier transform portion 373.

The inverse discrete Fourier transform portion 373 computes an inverse discrete Fourier transform.

The inverse discrete Fourier transform result that has been generated by the inverse discrete Fourier transform portion 373 is output to a noise removal and closed region selection portion 374.

The noise removal and closed region selection portion 374 removes noise from the inverse discrete Fourier transform result that has been generated by the inverse discrete Fourier transform portion 373, selects a closed region, performs PSF estimation, and generates a first PSF (a long exposure time image PSF) 381.

A specific example of the processing in the PSF estimation portion 202 will be explained.

Assume that the positions of the pixels that make up an image are expressed as coordinate positions (x, y), that f(x, y) defines the pixel values at the individual pixel positions (x, y) in the second exposure time image (the short exposure time image) 322, that g(x, y) defines the pixel values at the individual pixel positions (x, y) in the first exposure time image (the long exposure time image) 321, and that p(x, y) defines the values of the PSF (the point spread function) at the individual pixel positions (x, y).

However, for purposes of this explanation, f(x, y) and g(x, y) are assumed to be monochromatic images instead of Bayer arrays, and saturation (blowing out) of the pixels is ignored. The first exposure time image (the long exposure time image) 321 is affected by the camera instability, so it is expressed as shown below.

Note that the asterisk (*) indicates a convolution computation.

$$g(x,y)=p(x,y)*f(x,y) \quad \text{Equation 1}$$

In other words, the pixel values g(x, y) at the individual pixel positions (x, y) in the first exposure time image (the long exposure time image) 321 are computed by performing a convolution computation of the PSF and the second exposure time image (the short exposure time image) 322.

The results of the discrete Fourier transforms for f(x, y) for the second exposure time image (the short exposure time image) 322, g(x, y) for the first exposure time image (the long exposure time image) 321, and p(x, y) for the PSF are expressed as described below.

The discrete Fourier transform result for f(x, y) for the second exposure time image (the short exposure time image) 322 is F(u, v). The discrete Fourier transform result for g(x, y) for the first exposure time image (the long exposure time image) 321 is G(u, v). The discrete Fourier transform result for p(x, y) for the PSF is P(u, v).

When the discrete Fourier transform results are used, Equation 1 above can be expressed as Equation 2 below.

$$G(u,v)=P(u,v)\cdot F(u,v) \quad \text{Equation 2}$$

Note that "·" means the multiplication of each frequency component.

In other words, the discrete Fourier transform result G(u, v) for g(x, y) for the first exposure time image (the long exposure time image) 321 is computed by multiplying the discrete Fourier transform result P(u, v) for p(x, y) for the PSF times the discrete Fourier transform result F(u, v) for f(x, y) for the second exposure time image (the short exposure time image) 322, one frequency component at a time.

Based on Equation 1 and Equation 2, Equation 3 can be used to compute p(x, y) for the PSF.

$$P(u,v)=G(u,v)/F(u,v) \quad \text{Equation 3}$$

The discrete Fourier transform result P(u, v) for p(x, y) is computed according to Equation 3, and the inverse discrete Fourier transform of the computed discrete Fourier transform result P(u, v) may also be computed.

Note that "/" in Equation 3 above indicates the division of each frequency component.

This procedure makes it possible to derive f(x, y) for the second exposure time image (the short exposure time image) 322 and g(x, y) for the first exposure time image (the long exposure time image) 321, and p(x, y) for the PSF (the point spread function) can also be derived using these results.

However, the image brightnesses of a short exposure time image and a long exposure time image are actually different, so a situation is conceivable in which an area that can be seen in a short exposure time image is completely saturated and blown out in a long exposure time image. In that case, Equation 1 above is invalidated by the effects of the saturation.

Accordingly, processing is actually performed in the exposure correction portion 362 that multiplies the exposure ratio (4 in the example in the present disclosure) times the G pixel data that have been generated from the second exposure time image (the short exposure time image) 322, then replaces the pixel values that are greater than a saturated pixel value with the saturated pixel value. In the G pixel data that are produced by this processing and in the G pixel data that have been generated from the first exposure time image (the long exposure time image) 321, the positions of the saturated pixels match almost perfectly, so it is possible to eliminate the effects of the saturation of the pixels.

Furthermore, the effects of noise are significant only in processing that divides by the frequency space, as in the technique that is shown by Equation 3 above, and in a case where the discrete Fourier transform result F(u, v) for f(x, y) for the second exposure time image (the short exposure time image) 322 is close to zero, Equation 3 becomes a case of division by zero. That is, as shown in FIG. 6, the result that is computed by Equation 3 above in the inverse discrete Fourier transform portion 373 becomes a PSF that includes a large amount of noise.

Accordingly, in the image capture device according to the present disclosure, the processing is performed by taking into consideration the properties of the image capture device that pixels that are captured under a first exposure condition and pixels that are captured under a second exposure condition are captured almost simultaneously and that the PSF where there is camera instability is in a coupled form, and small amounts of high frequency noise are not included.

As is understood from the exposure times that have been explained with reference to part (b) of FIG. 3, the first exposure time image (the long exposure time image) 321 is being exposed during the exposure period for the second exposure time image (the short exposure time image) 322. This means that the PSF that is generated based on the two images that have the overlapping exposure periods will definitely pass through an origin point.

The noise removal and closed region selection portion 374 that is shown in FIG. 6 takes advantage of this when it inputs the result that has been computed by Equation 3 above in the inverse discrete Fourier transform portion 373, removes the high frequency noise from the input, and selects a closed region that passes through the origin point. A normalization portion 375 performs normalization processing such that the sum of the pixel values in the selected closed region will equal the exposure ratio (4.0 in the example in the present disclosure). The first PSF (the long exposure time image PSF) 381 is generated with little noise as a result.

Next, the second half of the PSF estimation portion 202 will be explained with reference to FIG. 7.

In the second half of the PSF estimation portion 202, a higher precision first PSF (the long exposure time image PSF) and a second PSF (a short exposure time image PSF) are computed by assuming that the PSF has a linear form.

The first PSF (the long exposure time image PSF) 381 that was generated in the first half of the PSF estimation portion 202 that was explained with reference to FIG. 6 is input, and the center of gravity of the PSF is detected by a center of gravity detection portion 401. Because the form of the PSF is assumed to be linear, under normal circumstances, a line segment that links the origin point and the center of gravity becomes a line segment that is extended to twice its original length, with the origin point at the center. Accordingly, in a PSF correction processing portion 402, a first high precision PSF 421 is generated by performing computation that generates the line segment that has been extended to twice its original length, with the origin point at the center.

The length of a second PSF (a short exposure time image PSF) 422 becomes data that are computed by multiplying the exposure ratio times the length of the first PSF (the long exposure time image PSF) 381. Accordingly, in a second PSF computation portion 403, an extended line segment with the origin point at the center is generated by multiplying the line segment that links the origin point and the center of gravity of the first PSF (the long exposure time image PSF) 381 by the result of the equation below.

2×(exposure time for second exposure condition)÷
(exposure time for first exposure condition)

The result is output as the second PSF (the short exposure time image PSF) 422.

(3-3) Details of the Configuration of and the Processing that is Performed by the Image Stabilization and Dynamic Range Expansion Processing Portion 203

Next, the details of the configuration of and processing that is performed by the image stabilization and dynamic range expansion processing portion 203 that is shown in FIG. 4 will be explained.

The image stabilization and dynamic range expansion processing portion 203 sets an initial image based on the second exposure time image (the short exposure time image) 322, which has little blurring, computes a correction amount such that there will be little difference between an actually observed image and an estimated image in which the initial image has been blurred by the PSF, and updates the initial image.

This processing is able to expand the dynamic range while removing noise and remedying the deterioration of the gray levels in dark areas of the initial image, as well as eliminating the effects of camera instability.

A specific example of the processing will be explained.

When the initial image is updated using a first correction amount that has been computed based on the first exposure time image (the long exposure time image) 321, the computation below is performed.

$$h'(x,y)=h(x,y)+\lambda p'(x,y)*\{g(x,y)-p(x,y)*h(x,y)\} \quad \text{Equation 4}$$

Note that in Equation 4 above, p'(x, y) is an inverse PSF that is derived by inverting the PSF symmetrically with respect to a point, λ is a parameter for adjustment (a parameter that is set in advance or that is set by a user), h(x, y) is the initial image, h'(x, y) is the updated initial image that is the result of the correction, and * indicates a convolution computation.

Equation 4 above is expressed without distinguishing among colors, but actually, convolution computation that will be described later is performed by using a color-specific PSF and an inverse color-specific PSF for each color (phase) of the object pixel.

A detailed configuration of the image stabilization and dynamic range expansion processing portion 203, and the processing that it performs, will be explained with reference to FIG. 8.

From the interpolation processing portion 201, which has been explained with reference to FIGS. 4 and 5, the image stabilization and dynamic range expansion processing portion 203 inputs the two images, the first exposure time image (the long exposure time image) 321 and the second exposure time image (the short exposure time image) 322, that have been generated by the interpolation processing portion 201.

First, for the images 321, 322 that have been input, the image stabilization and dynamic range expansion processing portion 203 performs bit shifting of the configuring pixel values in first and second bit shift portions 511 and 521, respectively. The bit shifting produces a first high gradation image 512 and a second high gradation image 522 that have high bit gray levels.

For example, in a case where the pixel values in the input images, that is, the first exposure time image (the long exposure time image) 321 and the second exposure time image (the short exposure time image) 322, are in the form of 10-bit data, the first and second bit shift portions 511 and 521 set the individual pixel values in the images as 16-bit data.

Figure 8:
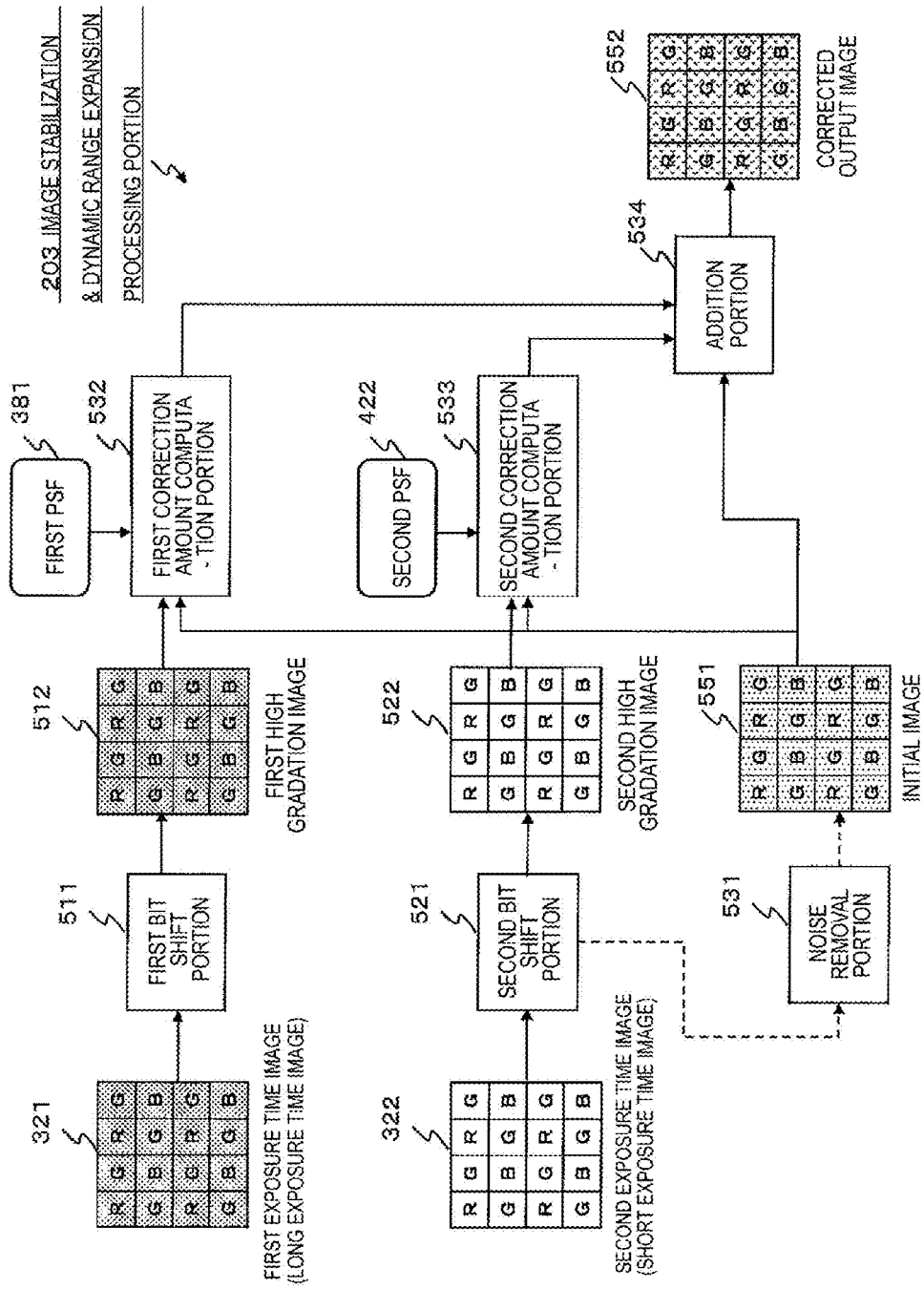
FIG. 8 is a figure that explains an example of a configuration of and processing by an image stabilization and dynamic range expansion processing portion of the image correction portion in the image processing device according to the present disclosure.

An initial image 551 that is shown in FIG. 8 initially uses an image on which noise removal has been performed by a noise removal portion 531, in contrast to the second high gradation image 522 that has been generated based on the second exposure time image (the short exposure time image) 322.

Next, in a first correction amount computation portion 532, a first correction amount is computed based on the first high gradation image 512 that has been generated based on the first exposure time image (the long exposure time image) 321, the first PSF (the long exposure time image PSF) 381 that has been generated by the PSF estimation portion 202, and the initial image 551.

The correction amount computation processing that is performed by the first correction amount computation portion 532 will be described in greater detail at a later stage.

Note that the first high precision PSF 421 that was explained with reference to FIG. 7 may also be used instead of the first PSF (the long exposure time image PSF) 381.

In a second correction amount computation portion 533, a second correction amount is also computed based on the second high gradation image 522 that has been generated based on the second exposure time image (the short exposure time image) 322, the second PSF (the short exposure time image PSF) 422 that has been generated by the PSF estimation portion 202, and the initial image 551.

Next, in an addition portion 534, the first correction amount and the second correction amount are added to the initial image 551 to produce a corrected output image 552.

Note that the corrected output image 552 may also be set as the initial image 551, the same processing may be repeated, and the corrected output image 552 may be successively updated to ultimately generate a final corrected output image 552.

Note that, as stated previously, in the processing in the first correction amount computation portion 532 that computes the first correction amount that corresponds to the first exposure time image (the long exposure time image) 321, either one of the first PSF (the long exposure time image PSF) 381 that was generated in the PSF estimation portion 202 and that was explained with reference to FIG. 6 and the first high precision PSF 421 that was generated in the PSF estimation portion 202 and that was explained with reference to FIG. 7 can be used.

Furthermore, the noise removal portion 531 is added processing, and the image stabilization and dynamic range expansion processing portion 203 may also be configured such that the noise removal portion 531 is omitted.

Note that in a case where it is determined that the exposure time for the second exposure time image 322, which is the short exposure time image, is sufficiently short that there is no blurring in the second exposure time image 322, it is also possible to configure the image capture device such that the computation of the second PSF (the short exposure time image PSF) 422 in the PSF estimation portion 202, which was explained earlier with reference to FIG. 7, and the second correction amount computation portion 533 in the image stabilization and dynamic range expansion processing portion 203 that is shown in FIG. 8 are omitted.

Figure 9:
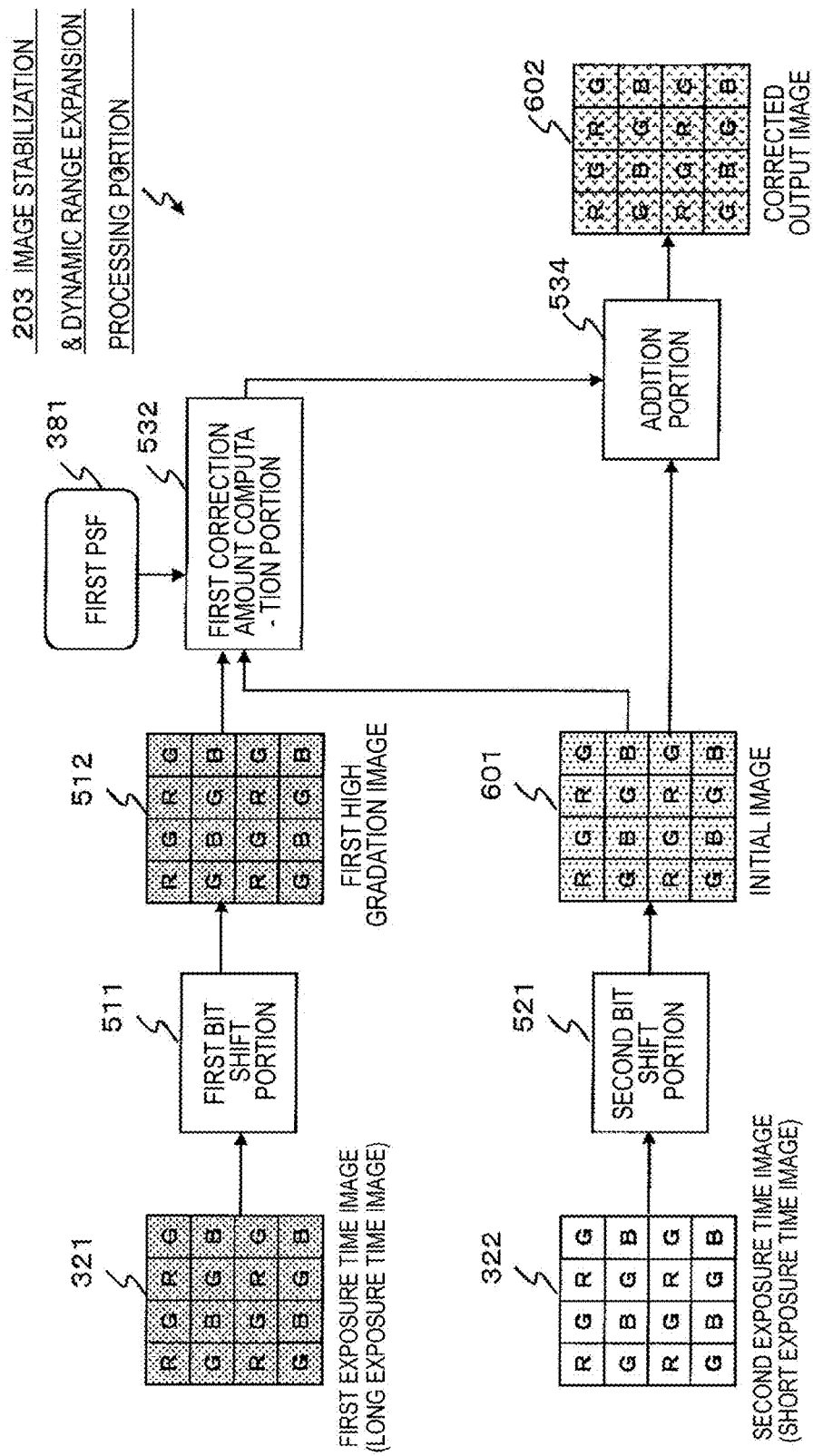
FIG. 9 is a figure that explains another example of the configuration of and the processing by the image stabilization and dynamic range expansion processing portion of the image correction portion in the image processing device according to the present disclosure.

In that case, the image stabilization and dynamic range expansion processing portion 203 can be configured as shown in FIG. 9, for example.

Note that the noise removal portion has been omitted in FIG. 9.

The corrected output image 552 that is produced as the result of the processing in the image stabilization and dynamic range expansion processing portion 203 that is shown in FIG. 8 is output to the signal processing portion 104 that is shown in FIG. 2.

By performing gray-level correction, demosaicing, gamma correction, and the like as necessary, the signal processing portion 104 generates and outputs the final output image 120.

Details of the First Correction Amount Computation Portion 532

Figure 10:
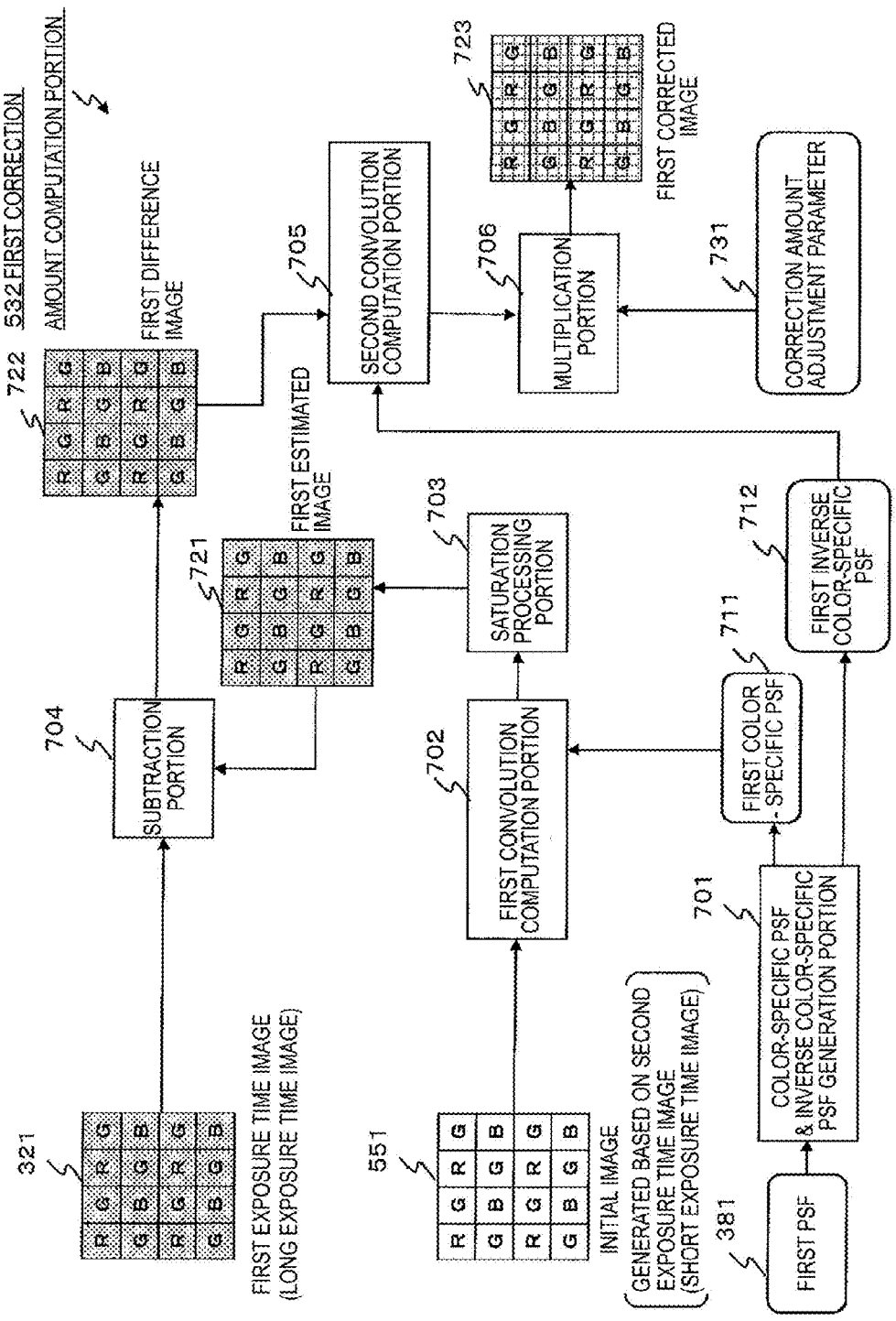
FIG. 10 is a figure that explains an example of a configuration of and processing by a first correction amount computation portion of the image stabilization and dynamic range expansion processing portion of the image correction portion in the image processing device according to the present disclosure.
Figure 11:
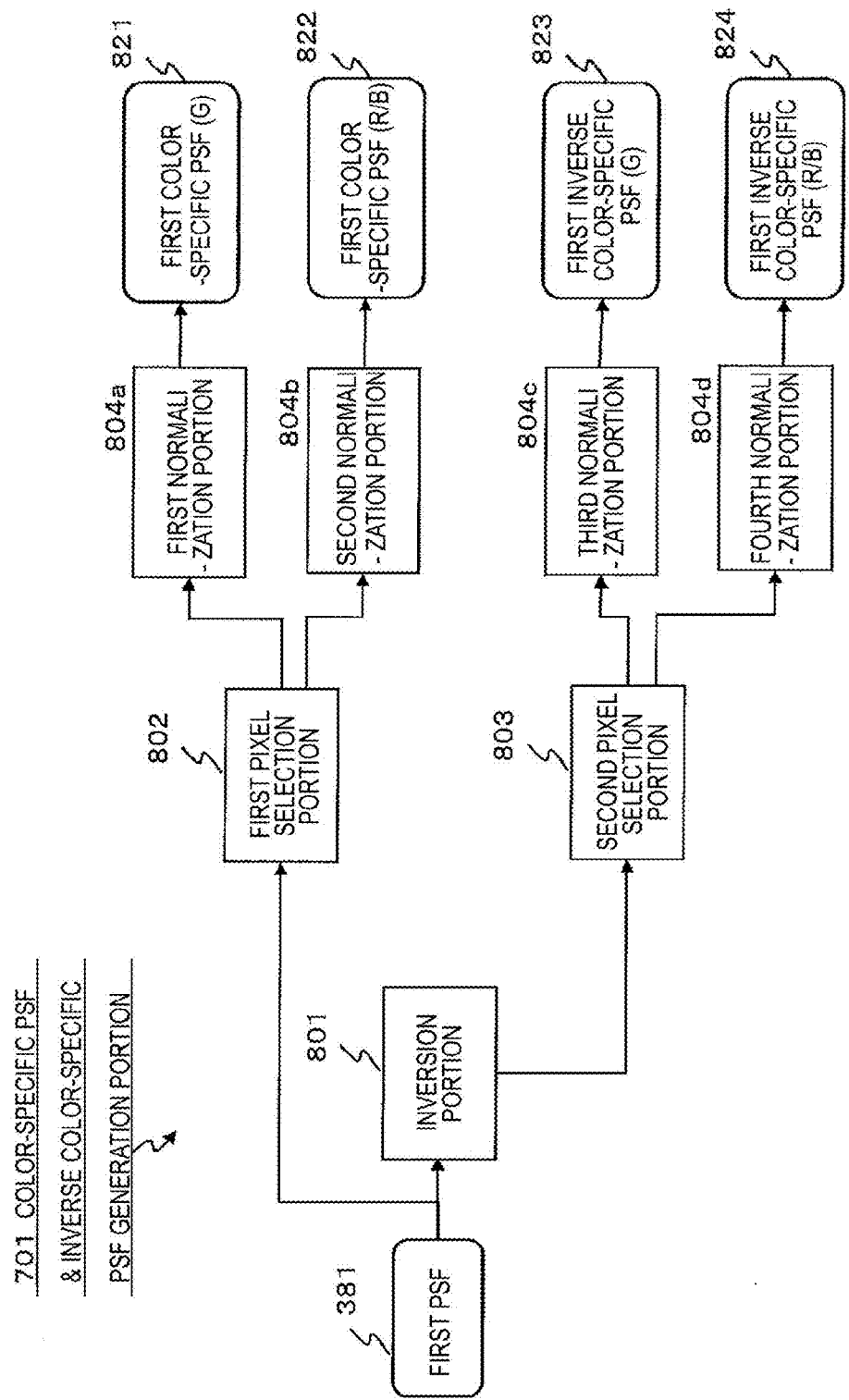
FIG. 11 is a figure that explains an example of a configuration of and processing by a color-specific PSF and inverse PSF color-specific generation portion of the image stabilization and dynamic range expansion processing portion of the image correction portion in the image processing device according to the present disclosure.

Next, the details of the first correction amount computation portion 532 that is shown in FIG. 8 will be explained with reference to FIGS. 10 and 11.

Note that the second correction amount computation portion 533 also has the same configuration.

First, first color-specific PSFs 711 and first inverse color-specific PSFs 712 are generated in a color-specific PSF and inverse color-specific PSF generation portion 701 in accordance with the color array in the image capture element 102.

Note that "color-specific" (phase-specific) means that, in the case of a Bayer array, the PSFs are generated to correspond to the three RGB colors, such that a PSF and an inverse PSF that correspond to R, a PSF and an inverse PSF that correspond to G, and a PSF and an inverse PSF that correspond to B are generated.

The first color-specific PSFs 711 are input to a first convolution computation portion 702.

The first convolution computation portion 702 performs a convolution computation using the first color-specific PSFs 711 that correspond to the colors of the object pixel in the initial image 551 (refer to FIG. 8) that was generated based on the second exposure time image (the short exposure time image) 322.

The convolution computation results that are generated by the first convolution computation portion 702 are output to a saturation processing portion 703.

The saturation processing portion 703 inputs the convolution computation results that have been generated by the first convolution computation portion 702 and performs saturation processing that takes the pixel values that are not less than a predetermined threshold value and saturates them at the threshold value.

This processing generates an image (a first estimated image 721) that it can be predicted, based on the initial image 551 and the first PSF (the long exposure time image PSF) 381, will be produced when an image is captured under the first exposure condition (the long exposure time).

The first correction amount computation portion 532 computes the first correction amount such that the difference between the first estimated image 721 and the first exposure time image (the long exposure time image) 321 that was generated by the interpolation processing portion 201 will become smaller.

A subtraction portion 704 generates a first difference image 722 that defines the difference between the first estimated image 721 and the first exposure time image (the long exposure time image) 321 that was generated by the interpolation processing portion 201.

The subtraction portion 704 produces the first difference image 722 by performing processing that subtracts the pixel values of the first estimated image 721 from the corresponding pixel values in the first exposure time image (the long exposure time image) 321 that was generated by the interpolation processing portion 201.

Next, a second convolution computation portion 705 performs a convolution computation using the first inverse color-specific PSFs 712 for each of the colors (R, G, B) of the object pixels, which are selected sequentially.

Finally, the first correction amount is produced by a multiplication portion 706 that multiplies the computation result from the second convolution computation portion 705 times a correction amount adjustment parameter 731.

One of a predetermined value and a value that is set by the user can be used for the correction amount adjustment parameter 731.

Next, a detailed configuration of the color-specific PSF and inverse color-specific PSF generation portion 701 and its processing will be explained with reference to FIG. 11.

In this processing, color-specific PSFs 821, 822, the properties of which are matched to the colors (the phases) of the solid image capture element, are computed in order to perform image stabilization of the color array (the Bayer array in the present example) of the image capture element 102 in its existing form.

At the same time, inverse color-specific PSFs 823, 824 are computed that invert the color-specific PSFs symmetrically with respect to a point.

First, the pixels for each color (phase) (R, G, B) in the first PSF (the long exposure time image PSF) 381 that has been input to the color-specific PSF and inverse color-specific PSF generation portion 701 are extracted in a first pixel selection portion 802. In the case of the Bayer array, for example, the G pixels are extracted in a checkerboard pattern, and the R and B pixels are extracted for every second pixel.

Thereafter, processing is performed in first and second normalization portions 804a, 804b that performs normalization according to the exposure ratio of the initial image 551 and the first exposure time image (the long exposure time image) 321.

In the present example, as explained previously with reference to FIG. 3, the exposure ratio of the short exposure time to the long exposure time is 1:4, so the normalization is performed such that the total values for the color-specific PSFs 821, 822 are each 4.0.

Furthermore, in an inversion portion 801, the first PSF (the long exposure time image PSF) 381 is inverted symmetrically with respect to a point, and in a second pixel selection portion 803, the pixels are extracted that correspond to the individual colors (R, G, B). Then, in third and fourth normalization portions 804c, 804d, inverse color-specific PSFs 823, 824 are output by performing normalization such that the total values are the inverse of the exposure ratio, that is, 0.25.

4. Examples of Other Configurations

Next, examples of other configurations that are different from the example that is described above will be explained.

As explained previously, in a case the exposure time for the second exposure condition (the short exposure time) is sufficiently short that there is no blurring in the captured image, it is possible to configure the image capture device such that the processing that generates the second PSF (the short exposure time image PSF) 422 in the PSF estimation portion 202 that is shown in FIG. 7 and the second correction amount computation portion 533 in the image stabilization and dynamic range expansion processing portion 203 that is shown in FIG. 8 are omitted, as shown in FIG. 9.

Furthermore, a technique that combines the Bayer arrays in their existing form was shown in FIG. 8 as one example of a configuration, but it is also possible to perform demosaic processing first, and then to perform the processing on an image in which the RGB pixel values that correspond to each of the pixel positions have been set.

Figure 12:
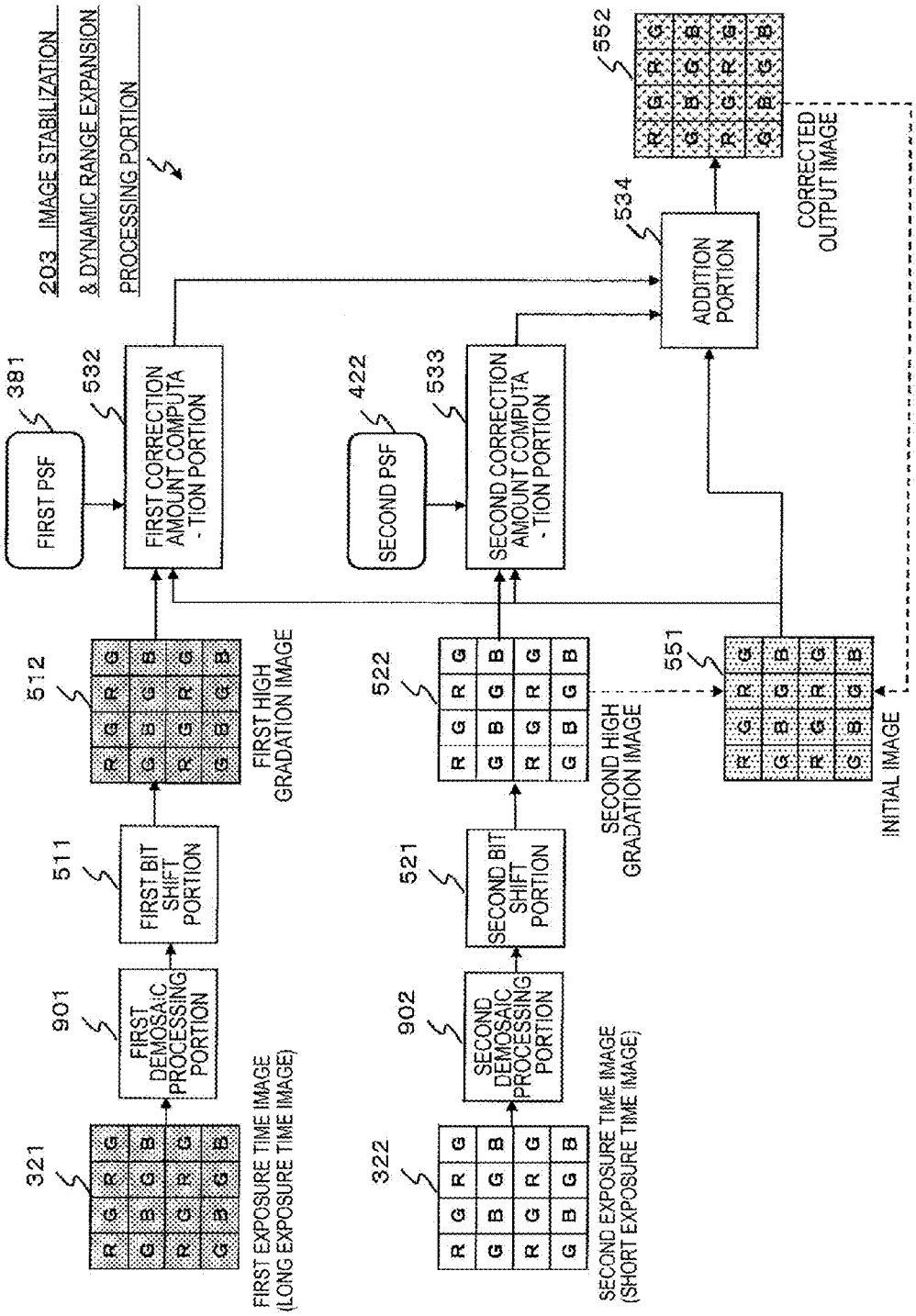
FIG. 12 is a figure that explains another example of the configuration of and the processing by the image stabilization and dynamic range expansion processing portion of the image correction portion in the image processing device according to the present disclosure.

An example of the configuration of the image stabilization and dynamic range expansion processing portion 203 is shown in FIG. 12 in which the demosaic processing is performed first, after which the image stabilization and the dynamic range expansion processing are performed.

First, as shown in FIG. 12, the images that have been generated by the interpolation processing portion 201, that is, the first exposure time image (the long exposure time image) 321 and the second exposure time image (the short exposure time image) 322, are input to first and second demosaic processing portions 901, 902, respectively.

The first and second demosaic processing portions 901, 902 perform the demosaic processing on the first exposure time image (the long exposure time image) 321 and the second exposure time image (the short exposure time image) 322, respectively, converting them into images in which the three RGB colors have been set for each of the pixel positions.

The subsequent processing basically performs the same sort of processing as the processing that was explained previously with reference to FIG. 8, performing it separately for the R, G, and B images. However, the three RGB colors have been set for all of the pixel positions, so it is not necessary to use the color-specific PSF and the inverse color-specific PSF.

Furthermore, utilizing the characteristic that blurring is less noticeable in a color difference signal than in a brightness signal, the computed amount can be reduced by converting the RGB image into a YCbCr space and performing the processing only with respect to the Y signal.

An example of the settings for the long exposure time pixels and the short exposure time pixels in the pixel array of the CMOS image sensor, for example, that serves as the image capture element 102 was explained earlier with reference to FIG. 3.

The pattern that is shown in FIG. 3 is merely one example, and it is possible to set various other types of pixel patterns. It is possible to apply the present technique by designing the image capture device such that the interpolation processing portion 201 and the color-specific PSF and inverse color-specific PSF generation portion 701 are combined in the pixel array.

For example, the present technique can be applied to an image sensor with the pixel arrays that are shown in parts (A) and (B) of FIG. 13, as well as an image sensor with a color filter that is a non-Bayer array, as shown in part (C) of FIG. 13. Furthermore, in the example of the exposure control that was explained with reference to FIG. part (b) of FIG. 3, the control was implemented such that the exposure end times for the two exposure patterns are the same, but different exposure times may also be used, and the control may be performed such that the exposure start times are the same and the exposure end times are different, as shown in FIG. 14, for example.

5. Examples of Other Processing and Concomitant Configurations and their Effects As the image processing device (the image capture device) of the present disclosure, a technique has been proposed above that performs dynamic range expansion and image stabilization simultaneously by implementing exposure control for the image capture element (the image sensor) and processing for the output of the image capture element. The technique according to the present disclosure can also be used in combination with known optical image stabilization.

To summarize the configuration of the present disclosure and its effects, the effects described below are achieved, for example.

A stabilized image with an expanded dynamic range can be produced from a single captured image by signal processing. That means that an image is produced in which there is little noise, from dark areas to bright areas, and the effects of blurring are suppressed.

The image processing that is described above can also be applied to a solid image capture element with a simpler pixel array and control method than the known control method. Specifically, the processing can be performed on a pixel array with fewer exposure conditions (two) than in "Coded Rolling Shutter Photography: Flexible Space-Time Sampling" (ICCP2010), and the exposure control can also be configured simply and easily.

The color arrays for the input image and the output image can be processed as the existing Bayer arrays, so the compatibility with existing camera signal processing is high.

6. Summary of the Configurations of the Present Disclosure

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1)

An image processing device, including:

an image capture element that outputs long exposure time pixel information and short exposure time pixel information based on image capture processing under a control that provides different exposure times for individual pixels; and an image correction portion that inputs the pixel information that the image capture element has output and generates a corrected image by performing image stabilization and dynamic range expansion processing, wherein the image correction portion generates a long exposure time image in which the pixel values have been set on the assumption that all of the pixels have been exposed for a long time and a short exposure time image in which the pixel values have been set on the assumption that all of the pixels have been exposed for a short time, computes a point spread function (a PSF) that corresponds to the long exposure time image as a long exposure time image PSF, and generates the corrected image by using the short exposure time image, the long exposure time image, and the long exposure time image PSF.

(2)

The image processing device according to (1), wherein the image correction portion computes a PSF that corresponds to the short exposure time image as a short exposure time image PSF, and generates the corrected image by using the short exposure time image, the long exposure time image, the long exposure time image PSF, and the short exposure time image PSF.

(3)

The image processing device according to (1) or (2), wherein the image correction portion generates, based on the short exposure time image, a first estimated image for which it is assumed that exposure was performed for a long time, computes a first correction amount that makes a difference between the first estimated image and the long exposure time image smaller, and generates the corrected image by performing processing that adds the computed first correction amount to an initial image that has been generated based on the short exposure time image.

(4)

The image processing device according to any one of (1) to (3), wherein the image correction portion performs division processing that takes a result of a discrete Fourier transform that is based on a pixel value for a specific color that has been selected from the long exposure time image and divides it by a result of a discrete Fourier transform that is based on a pixel value for a specific color that has been selected from the short exposure time image, and computes the long exposure time image PSF by performing an inverse discrete Fourier transform on the result of the division processing and performing processing on the result of the inverse discrete Fourier transform that performs noise removal and identifies a linking component that passes through an origin point.

(5)

The image processing device according to any one of (1) to (4), wherein the image correction portion performs division processing that takes a result of a discrete Fourier transform that is based on a pixel value for a specific color that has been selected from the long exposure time image and divides it by a result of a discrete Fourier transform that is based on a pixel value for a specific color that has been selected from the short exposure time image, and computes the long exposure time image PSF by performing an inverse discrete Fourier transform on the result of the division processing, performing processing on the result of the inverse discrete Fourier transform that performs noise removal and identifies a linking closed region that passes through an origin point, extending the length of a line segment that links the origin point and the center of gravity of the closed region to twice its original length, with the origin point at the center, and defining the extended line segment as the long exposure time image PSF.

(6)

The image processing device any one of (1) to (5), wherein the image correction portion computes a PSF that corresponds to the short exposure time image as a short exposure time image PSF, computing the short exposure time image PSF by multiplying, by a factor that is equal to two times the ratio of an exposure time for a second exposure condition to an exposure time for a first exposure condition, the length of a line segment that links an origin point and the center of gravity of the long exposure time image PSF, with the origin point at the center.

(7)

The image processing device according to any one of (1) to (6), wherein the image correction portion includes a first correction amount computation portion that, from a long exposure time image PSF that is computed based on the long exposure time image, from an initial image that is generated based on the short exposure time image, and from the long exposure time image, computes a first correction amount for the initial image, a second correction amount computation portion that, from a short exposure time image PSF that is computed based on the short exposure time image, and from the initial image, computes a second correction amount for the initial image, and an addition portion that adds the first correction amount and the second correction amount for the initial image.

(8)

The image processing device according to any one of (1) to (7), wherein the first correction amount computation portion includes a first estimated image computation portion that computes a first estimated image that is a result of estimating an image that is similar to the long exposure time image, based on the initial image and the long exposure time image PSF, a subtraction portion that computes a first difference image that is the difference between the long exposure time image and the first estimated image, and a first correction amount estimation portion that computes the first correction amount based on the first difference image and the long exposure time image PSF.

(9)

The image processing device according to any one of (1) to (8), wherein the first estimated image computation portion includes a color-specific PSF computation portion that computes a first color-specific PSF that combines the characteristics of the long exposure time image PSF for each color (phase) of an image capture surface of the image capture element, a first convolution computation portion that performs a convolution computation for each color of an object pixel of the initial image using the first color-specific PSF, and a saturation processing portion that takes a results image that has been output from the first convolution computation portion and outputs an image by replacing pixel values that are not less than a value that is equivalent to a saturated pixel value of the image capture element with the value that is equivalent to the saturated pixel value.

(10)

The image processing device according to any one of (1) to (9), wherein the first correction amount estimation portion includes an inverse color-specific PSF computation portion that computes a first inverse color-specific PSF in which the long exposure time image PSF has been inverted symmetrically with respect to a point, a second convolution computation portion that performs a convolution computation for each color of an object pixel of the first difference image using the first inverse color-specific PSF, and a multiplication portion that performs a correction amount adjustment by multiplying a correction amount adjustment parameter times a results image that has been output from the second convolution computation portion.

(11)

The image processing device according to any one of (1) to (10), wherein the image correction portion includes a demosaic processing portion that performs demosaic processing on the long exposure time image and the short exposure time image, and the image correction portion generates the corrected image based on a demosaiced image that is a processing result of the demosaic processing portion.

Furthermore, the processing sequence that is explained in the specification can be implemented by hardware, by software and by a configuration that combines hardware and software. In a case where the processing is implemented by software, it is possible to install in memory within a computer that is incorporated into dedicated hardware a program in which the processing sequence is encoded and to execute the program. It is also possible to install a program in a general-purpose computer that is capable of performing various types of processing and to execute the program. For example, the program can be installed in advance in a storage medium. In addition to being installed in a computer from the storage medium, the program can also be received through a network, such as a local area network (LAN) or the Internet, and can be installed in a storage medium such as a hard disk or the like that is built into the computer.

Note that the various types of processing that are described in this specification may not only be performed in a temporal sequence as has been described, but may also be performed in parallel or individually, in accordance with the processing capacity of the device that performs the processing or as needed. Furthermore, the system in this specification is not limited to being a configuration that logically aggregates a plurality of devices, all of which are contained within the same housing.

INDUSTRIAL APPLICABILITY

As explained above, according to the example of the present disclosure, a device and a method are achieved that generate an image with reduced blurring and a wide dynamic range based on a single captured image. Specifically, the device includes an image capture element that outputs long exposure time pixel information and short exposure time pixel information based on image capture processing under a control that provides different exposure times for individual pixels, and also includes an image correction portion that inputs the pixel information that the image capture element has output and generates a corrected image by performing image stabilization and dynamic range expansion processing.

The image correction portion generates a long exposure time image in which the pixel values have been set on the assumption that all of the pixels have been exposed for a long time and a short exposure time image in which the pixel values have been set on the assumption that all of the pixels have been exposed for a short time, computes a point spread function (a PSF) that corresponds to the long exposure time image as a long exposure time image PSF, and generates the corrected image by using the short exposure time image, the long exposure time image, and the long exposure time image PSF. The corrected image is generated as a wide dynamic range image that utilizes the pixel information for the long exposure time image and the pixel information for the short exposure time image. Utilizing the pixel information for the short exposure time image, in which there is little blurring, also makes the corrected image a high quality corrected image in which the blurring is suppressed.

The present disclosure contains subject matter related to that disclosed in Japanese Priority Patent Application JP 2011-102915 filed in the Japan Patent Office on May 2, 2011, the entire content of which is hereby incorporated by reference.

What is claimed is:

1. An image processing device, comprising:
    an image capture unit configured to generate an initial output image, wherein the image capture unit comprises a plurality of pixels, and wherein the plurality of pixels include a first group of pixels with a first exposure time and a second group of pixels with a second exposure time;
    an interpolation processing unit configured to generate at least a first interpolated image based on the first group of pixels with the first exposure time and a second interpolated image based on the second group of pixels with the second exposure time;
    a bit shift unit configured to generate at least two gradation images, which include a first gradation image corresponding to the first interpolated image and a second gradation image corresponding to the second interpolated image;
    a correction amount computation unit configured to compute at least two correction amounts,
        wherein the at least two correction amounts include a first correction amount and a second correction amount, and
        wherein the first correction amount is computed based, at least in part, on the first gradation image and the initial output image, and the second correction amount is computed based, at least in part, on the second gradation image and the initial output image; and
    an addition unit configured to add the at least two correction amounts to the initial output image to produce a corrected output image.

2. The image processing device of claim 1, further comprising a noise reduction unit configured to reduce noise of data associated with the second interpolated image to generate the initial output image.

3. The image processing device of claim 1, wherein the first correction amount is further based, at least in part, on a first point spread function (PSF) corresponding to the first interpolated image, and wherein the second correction amount is further based, at least in part, on a second point spread function (PSF) corresponding to the second interpolated image.

4. The image processing device of claim 1, wherein the image capture unit is configured to control the first and second groups of pixels such that the first exposure time and the second exposure time start at different times and end at the same time.

5. The image processing device of claim 1, wherein the interpolation processing unit, to generate the first interpolated image, is configured to:
    generate portions of the first interpolated image corresponding to positions of the first group of pixels based on pixel values of the first group of pixels;
    generate interpolated pixel values by interpolation of the pixel values of the first group of pixels; and
    generate portions of the first interpolated image corresponding to positions of the second group of pixels based, at least in part, on the interpolated pixel values.

6. The image processing device of claim 5, wherein interpolation of the pixel values of the first group of pixels further comprises interpolation of the pixel values of the first group of pixels by filters or linear interpolation of the pixel values of the first group of pixels.

7. The image processing device of claim 6, wherein generation of the interpolated pixel values comprises assignment of weights to the pixel values of the first group of pixels based, at least in part, on locations of edges in the first interpolated image.

8. An image processing method, comprising:
    generating, with a plurality of pixels, an initial output image, the plurality of pixels including a first group of pixels with a first exposure time and a second group of pixels with a second exposure time;
    generating at least a first interpolated image based on the first group of pixels with the first exposure time and a second interpolated image based on the second group of pixels with the second exposure time;
    generating at least two gradation images by bit shifting at least the first and second interpolated images, wherein the at least two gradation images include a first gradation image corresponding to the first interpolated image and a second gradation image corresponding to the second interpolated image;
    determining at least two correction amounts including a first correction amount and a second correction amount, wherein the first correction amount is determined based, at least in part, on the first gradation image and the initial output image, and the second correction amount is determined based, at least in part, on the second gradation image and the initial output image; and
    adding the at least two correction amounts to the initial output image to produce a corrected output image.

9. The image processing method of claim 8, further comprising:
    generating the initial output image by reducing noise of data associated with the second interpolated image.

10. The image processing method of claim 8, wherein the first correction amount is further determined based, at least in part, on a first point spread function (PSF) corresponding to the first interpolated image, and wherein the second correction amount is further determined based, at least in part, on a second point spread function (PSF) corresponding to the second interpolated image.

11. The image processing method of claim 8, wherein generating the initial output image comprises controlling the first and second groups of pixels such that the first exposure time and the second exposure time start at different times and end at the same time.

12. The image processing method of claim 8, wherein generating the first interpolated image based on the first group of pixels with the first exposure time comprises:
    generating portions of the first interpolated image corresponding to positions of the first group of pixels based on pixel values of the first group of pixels;
    generating interpolated pixel values by interpolating the pixel values of the first group of pixels; and
    generating portions of the first interpolated image corresponding to positions of the second group of pixels based, at least in part, on the interpolated pixel values.

13. The image processing method of claim 12, wherein interpolating the pixel values of the first group of pixels further comprises interpolating the pixel values of the first group of pixels by filters or linearly interpolating the pixel values of the first group of pixels.

14. The image processing method of claim 13, wherein generating the interpolated pixel values comprises assigning weights to the pixel values of the first group of pixels based, at least in part, on locations of edges in the first interpolated image.

15. A camera, comprising:
    an image processing device including:
        an image capture unit configured to generate an initial output image, wherein the image capture unit comprises a plurality of pixels, and wherein the plurality of pixels include a first group of pixels with a first exposure time and a second group of pixels with a second exposure time,
        an interpolation processing unit configured to generate at least a first interpolated image based on the first group of pixels with the first exposure time and a second interpolated image based on the second group of pixels with the second exposure time,
        a bit shift unit configured to generate at least two gradation images, which include a first gradation image corresponding to the first interpolated image and a second gradation image corresponding to the second interpolated image,
        a correction amount computation unit configured to compute at least two correction amounts,
            wherein the at least two correction amounts include a first correction amount and a second correction amount, and
            wherein the first correction amount is computed based, at least in part, on the first gradation image and the initial output image, and the second correction amount is computed based, at least in part, on the second gradation image and the initial output image, and
        an addition unit configured to add the at least two correction amounts to the initial output image to produce a corrected output image; and
    a display device configured to display the corrected output image.

16. The camera of claim 15, wherein the camera comprises a digital still camera.

17. The camera of claim 15, wherein the camera comprises a video camera.

18. The camera of claim 15, wherein the image capture unit includes a CMOS image sensor that comprises the plurality of pixels.

\* \* \* \* \*